US010392853B2

(12) United States Patent
Ren et al.

(10) Patent No.: US 10,392,853 B2
(45) Date of Patent: Aug. 27, 2019

(54) POWERED ACCESSORY PORT CLOSURE LID

(71) Applicant: NIO USA, Inc., San Jose, CA (US)

(72) Inventors: Ren Ren, San Jose, CA (US); Padmanabhan Kumar, Fremont, CA (US)

(73) Assignee: NIO USA, Inc., San Jose, CA (US)

( * ) Notice: Subject to any disclaimer, the term of this patent is extended or adjusted under 35 U.S.C. 154(b) by 73 days.

(21) Appl. No.: 15/794,391

(22) Filed: Oct. 26, 2017

(65) Prior Publication Data

US 2019/0128043 A1    May 2, 2019

(51) Int. Cl.
| | |
|---|---|
| *B60K 15/05* | (2006.01) |
| *E05F 15/608* | (2015.01) |
| *E06B 3/52* | (2006.01) |
| *E06B 5/00* | (2006.01) |
| *F16H 25/12* | (2006.01) |

(52) U.S. Cl.
CPC ............ *E05F 15/608* (2015.01); *B60K 15/05* (2013.01); *E06B 3/52* (2013.01); *E06B 5/00* (2013.01); *F16H 25/12* (2013.01); *B60K 2015/0538* (2013.01)

(58) Field of Classification Search
CPC .................. B60K 15/05; B60K 15/053; B60K 2015/0538; B60K 2015/053; B60K 2015/0546; E05F 15/53; E05F 15/54; E05F 15/60; E05F 15/70; E05F 15/608
USPC ........................... 296/97.22; 49/41, 397, 402
See application file for complete search history.

(56) References Cited

U.S. PATENT DOCUMENTS

| | | | |
|---|---|---|---|
| 4,385,469 A  * | 5/1983 | Scheuerpflug | .......... G21F 7/005 |
| | | | 109/8 |
| 5,096,253 A  * | 3/1992 | Jo | .............................. B60J 1/04 |
| | | | 296/190.1 |
| 8,089,228 B2 | 1/2012 | Ballard | |
| 8,243,137 B2 | 8/2012 | Schuetz | |
| 9,792,756 B2 * | 10/2017 | Yuyama | .................. B65B 35/06 |
| 9,895,969 B2 * | 2/2018 | Alexander | ............. B60K 15/05 |

* cited by examiner

*Primary Examiner* — Dennis H Pedder
(74) *Attorney, Agent, or Firm* — Sheridan Ross P.C.

(57) ABSTRACT

Systems of an electrical vehicle and the operations thereof are provided. A powered accessory port may be utilized to selectively reveal/conceal an interior portion, such as charging connection when the powered accessory port is disposed on the exterior of a vehicle, or a user device connection, such as when the powered accessory port is disposed in the interior of the vehicle. The powered accessory port, when energized, provides a rotational force that is partially translated into a longitudinal force such that the single rotational force provides both a lifting (or lowering) motion as well as a rotational motion.

19 Claims, 21 Drawing Sheets

POWERED ACCESSORY PORT CLOSURE LID

FIELD

The present disclosure is generally directed to vehicle closure systems, in particular, toward closure systems for accessories and access ports of vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
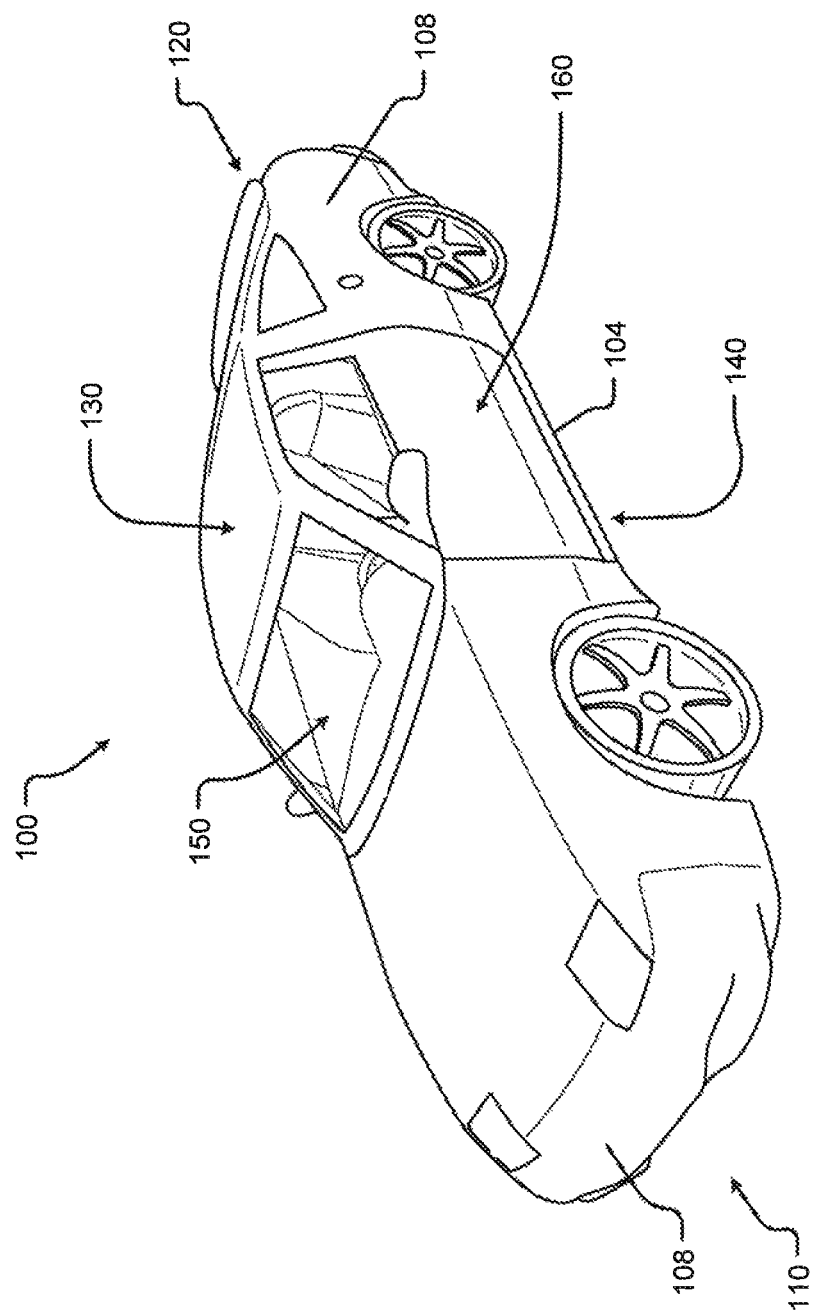
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
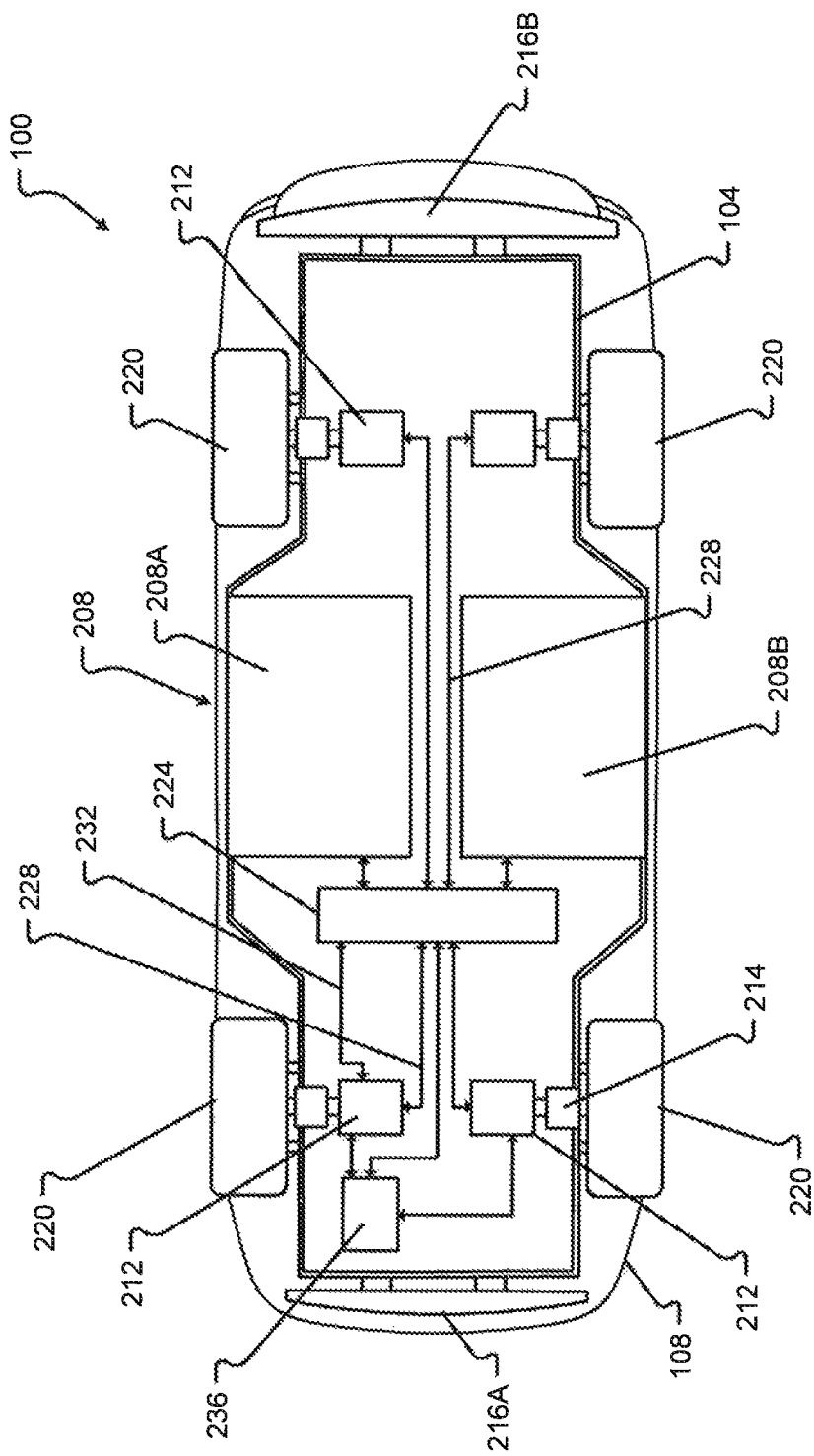
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
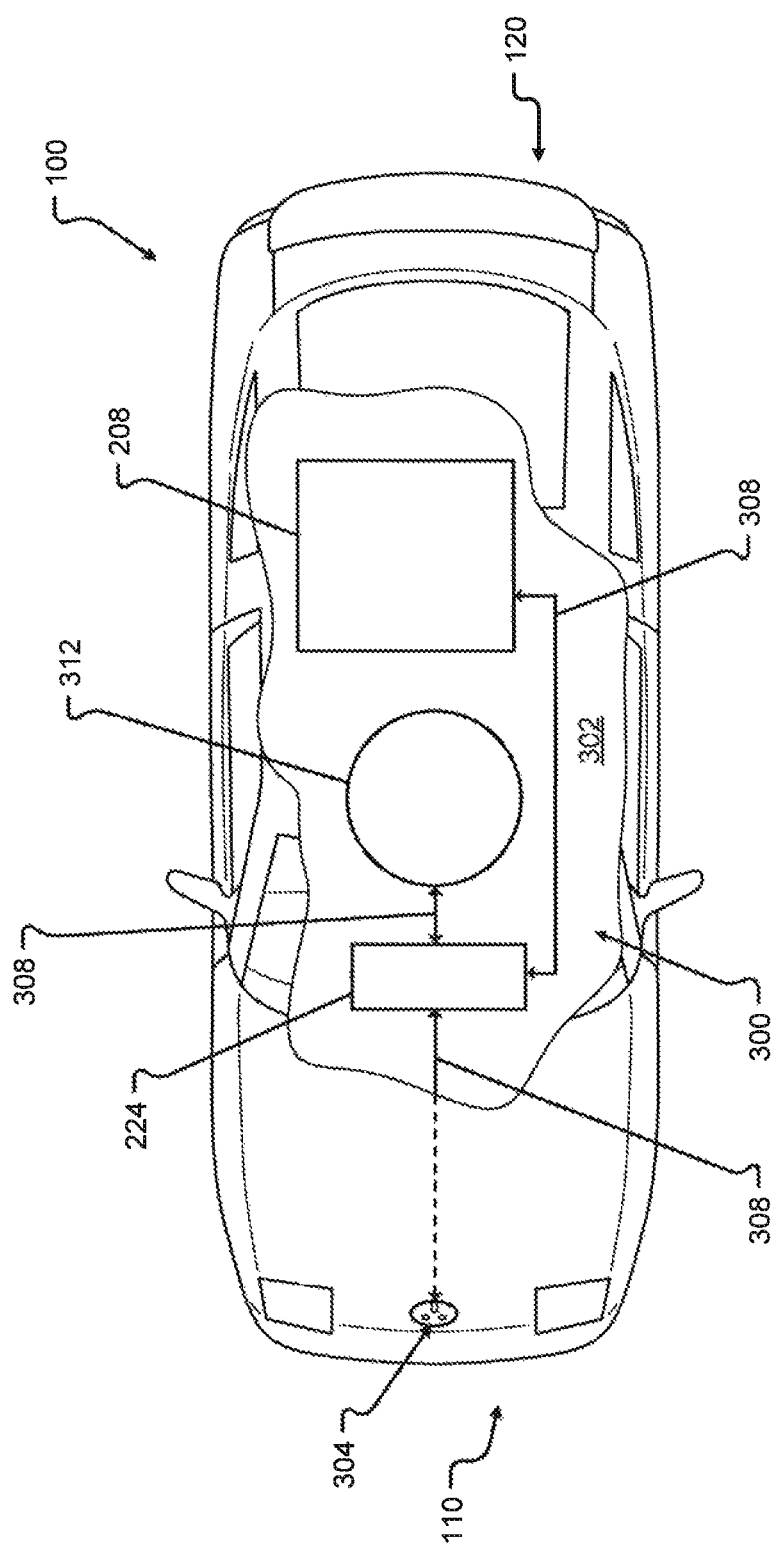
FIG. 3 shows a plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
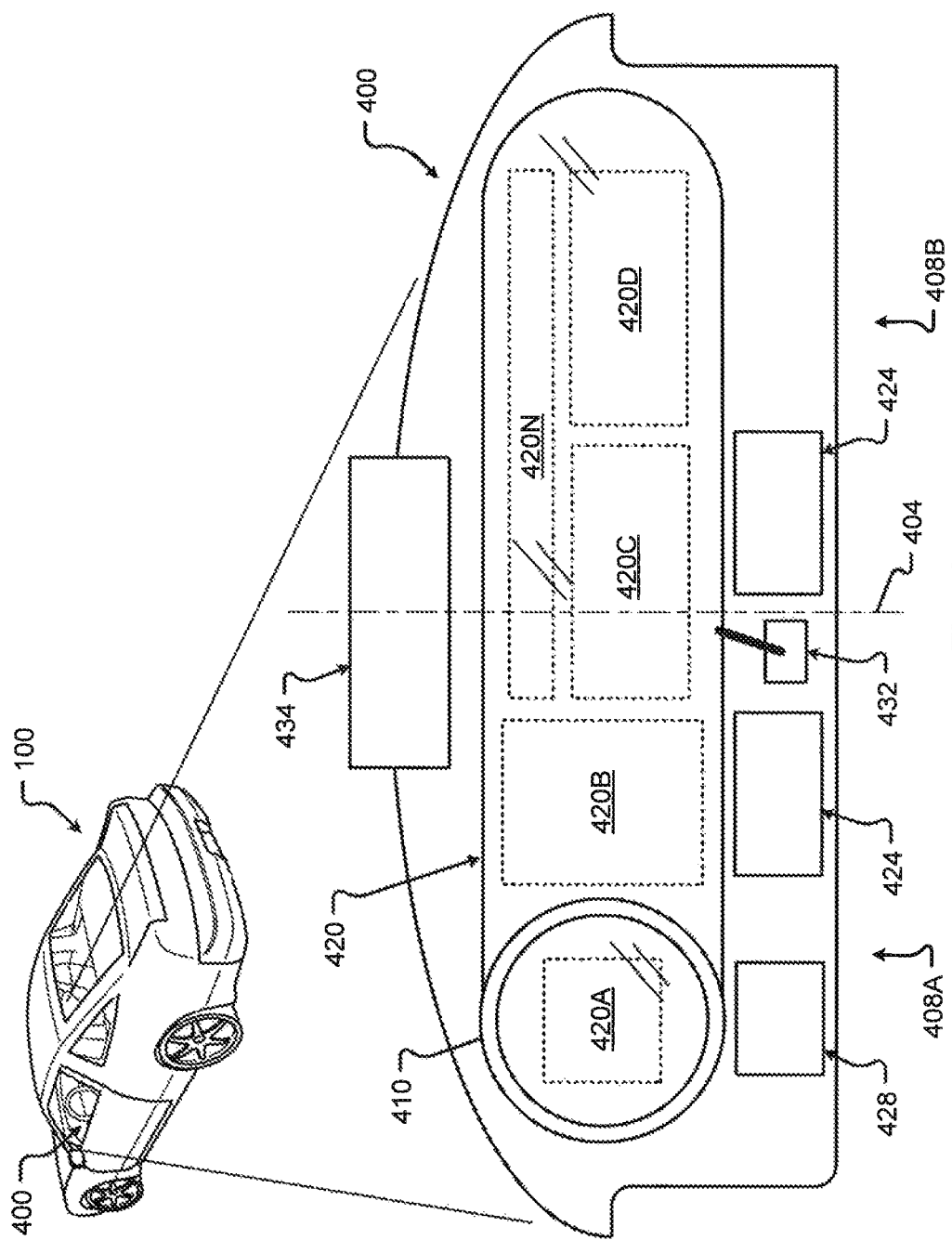
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
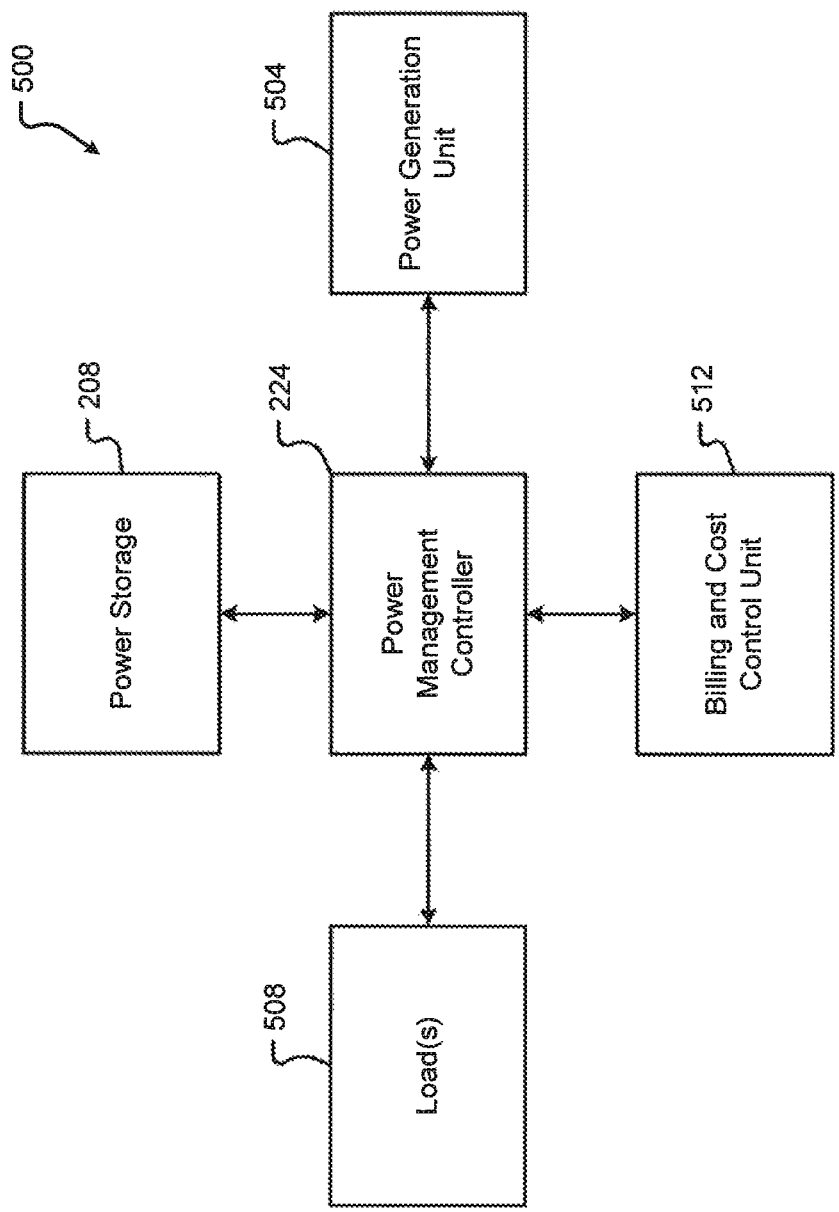
FIG. 5 is a block diagram of an embodiment of an electrical system of the vehicle.

An embodiment of the electrical system 500 associated with the vehicle 100 may be as shown in FIG. 5. The electrical system 500 can include power source(s) that generate power, power storage that stores power, and/or load(s) that consume power. Power sources may be associated with a power generation unit 504. Power storage may be associated with a power storage system 208. Loads may be associated with loads 508. The electrical system 500 may be managed by a power management controller 224. Further, the electrical system 500 can include one or more other interfaces or controllers, which can include the billing and cost control unit 512.

Figure 6:
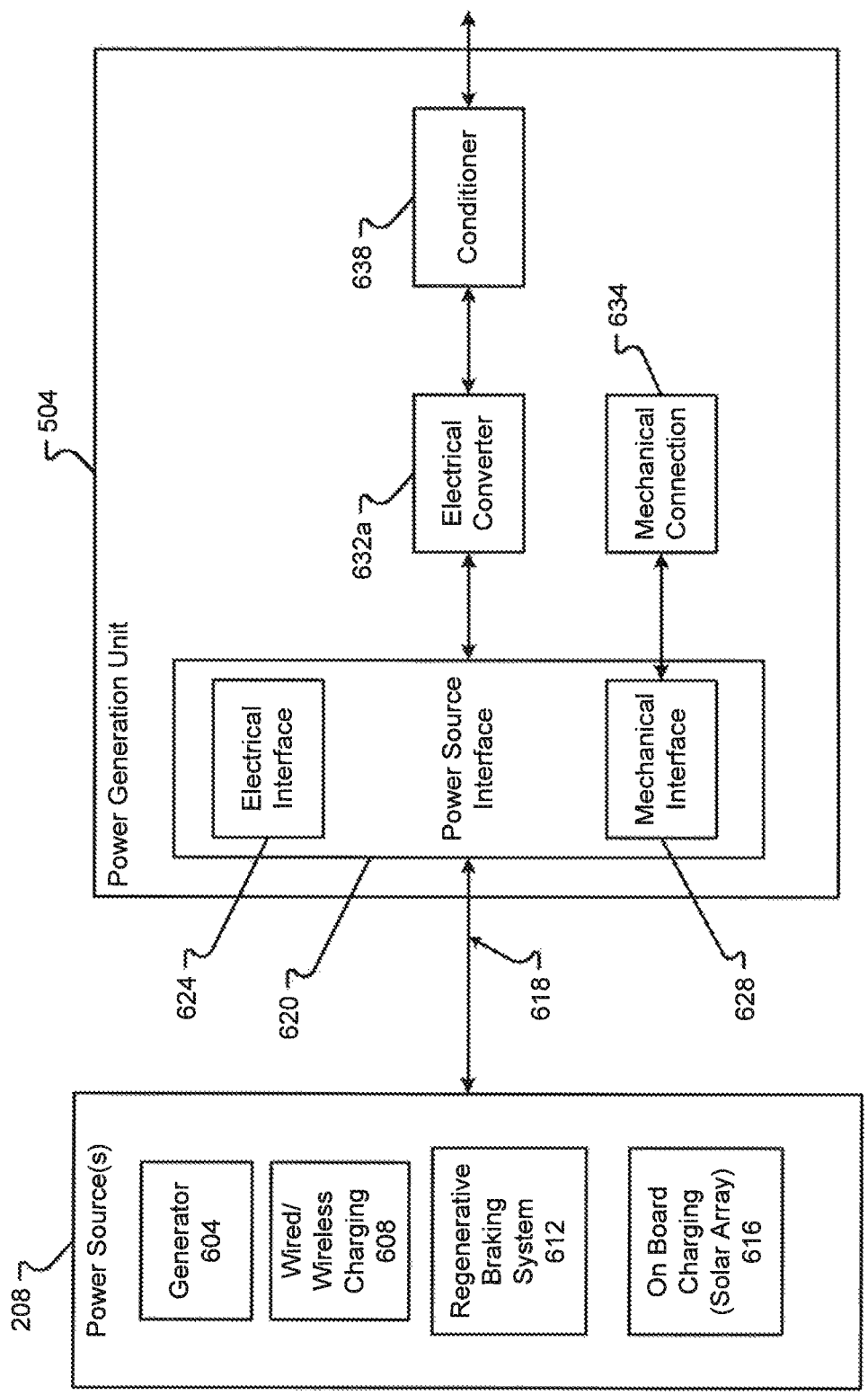
FIG. 6 is a block diagram of an embodiment of a power generation unit associated with the electrical system of the vehicle.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6. Generally, the power generation unit 504 may be electrically coupled to one or more power sources 208. The power sources 208 can include power sources internal and/or associated with the vehicle 100 and/or power sources external to the vehicle 100 to which the vehicle 100 electrically connects. One of the internal power sources can include an on-board generator 604. The generator 604 may be an alternating current (AC) generator, a direct current (DC) generator or a self-excited generator. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take -off The generator 604 may also have another mechanical coupling to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 608 can also include a physical/electrical connection 634 to the power generation unit 504.

The electrical energy from the power source 208 can be processed through the power source interface 624 to an electric converter 632. The electric converter 632 may convert the characteristics of the power from one of the power sources into a useable form that may be used either by the power storage 208 or one or more loads 508 within the vehicle 100. The electrical converter 624 may include any electronics or electrical devices and/or component that can change electrical characteristics, e.g., AC frequency, amplitude, phase, etc. associated with the electrical energy provided by the power source 208. The converted electrical energy may then be provided to an optional conditioner 638. The conditioner 638 may include any electronics or electrical devices and/or component that may further condition the converted electrical energy by removing harmonics, noise, etc. from the electrical energy to provide a more stable and effective form of power to the vehicle 100.

Figure 7:
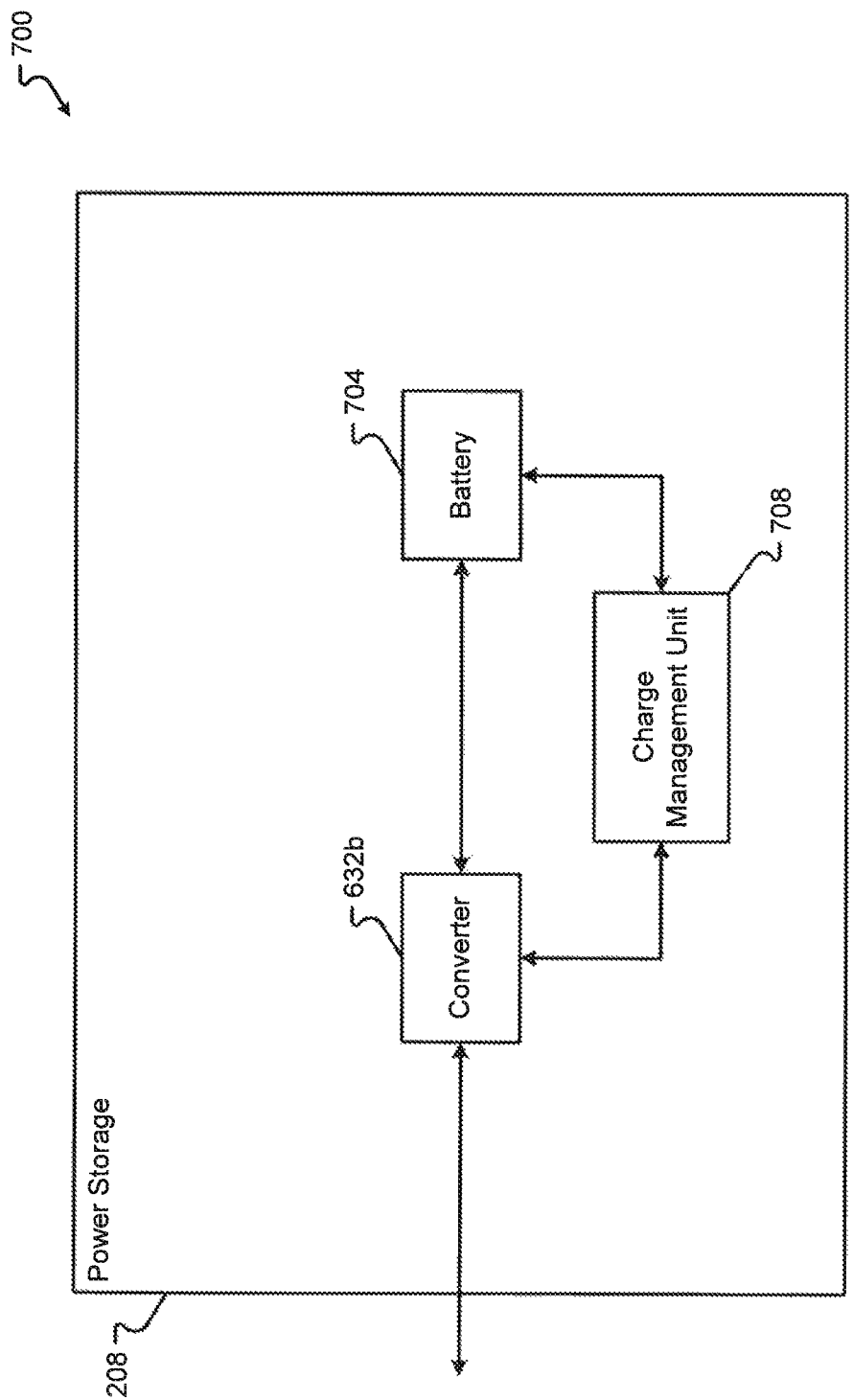
FIG. 7 is a block diagram of an embodiment of power storage associated with the electrical system of the vehicle.

An embodiment of the power storage 208 may be as shown in FIG. 7. The power storage unit can include an electrical converter 632b, one or more batteries, one or more rechargeable batteries, one or more capacitors, one or more accumulators, one or more supercapacitors, one or more ultrabatteries, and/or superconducting magnetics 704, and/or a charge management unit 708. The converter 632b may be the same or similar to the electrical converter 632a shown in FIG. 6. The converter 632b may be a replacement for the electric converter 632a shown in FIG. 6 and thus eliminate the need for the electrical converter 632a as shown in FIG. 6. However, if the electrical converter 632a is provided in the power generation unit 504, the converter 632b, as shown in the power storage unit 208, may be eliminated. The converter 632b can also be redundant or different from the electrical converter 632a shown in FIG. 6 and may provide a different form of energy to the battery and/or capacitors 704. Thus, the converter 632b can change the energy characteristics specifically for the battery/capacitor 704.

The battery 704 can be any type of battery for storing electrical energy, for example, a lithium ion battery, a lead acid battery, a nickel cadmium battery, etc. Further, the battery 704 may include different types of power storage systems, such as, ionic fluids or other types of fuel cell systems. The energy storage 704 may also include one or more high-capacity capacitors 704. The capacitors 704 may be used for long-term or short-term storage of electrical energy. The input into the battery or capacitor 704 may be different from the output, and thus, the capacitor 704 may be charged quickly but drain slowly. The functioning of the converter 632 and battery capacitor 704 may be monitored or managed by a charge management unit 708.

The charge management unit 708 can include any hardware (e.g., any electronics or electrical devices and/or components), software, or firmware operable to adjust the operations of the converter 632 or batteries/capacitors 704. The charge management unit 708 can receive inputs or periodically monitor the converter 632 and/or battery/capacitor 704 from this information; the charge management unit 708 may then adjust settings or inputs into the converter 632 or battery/capacitor 704 to control the operation of the power storage system 208.

Figure 8:
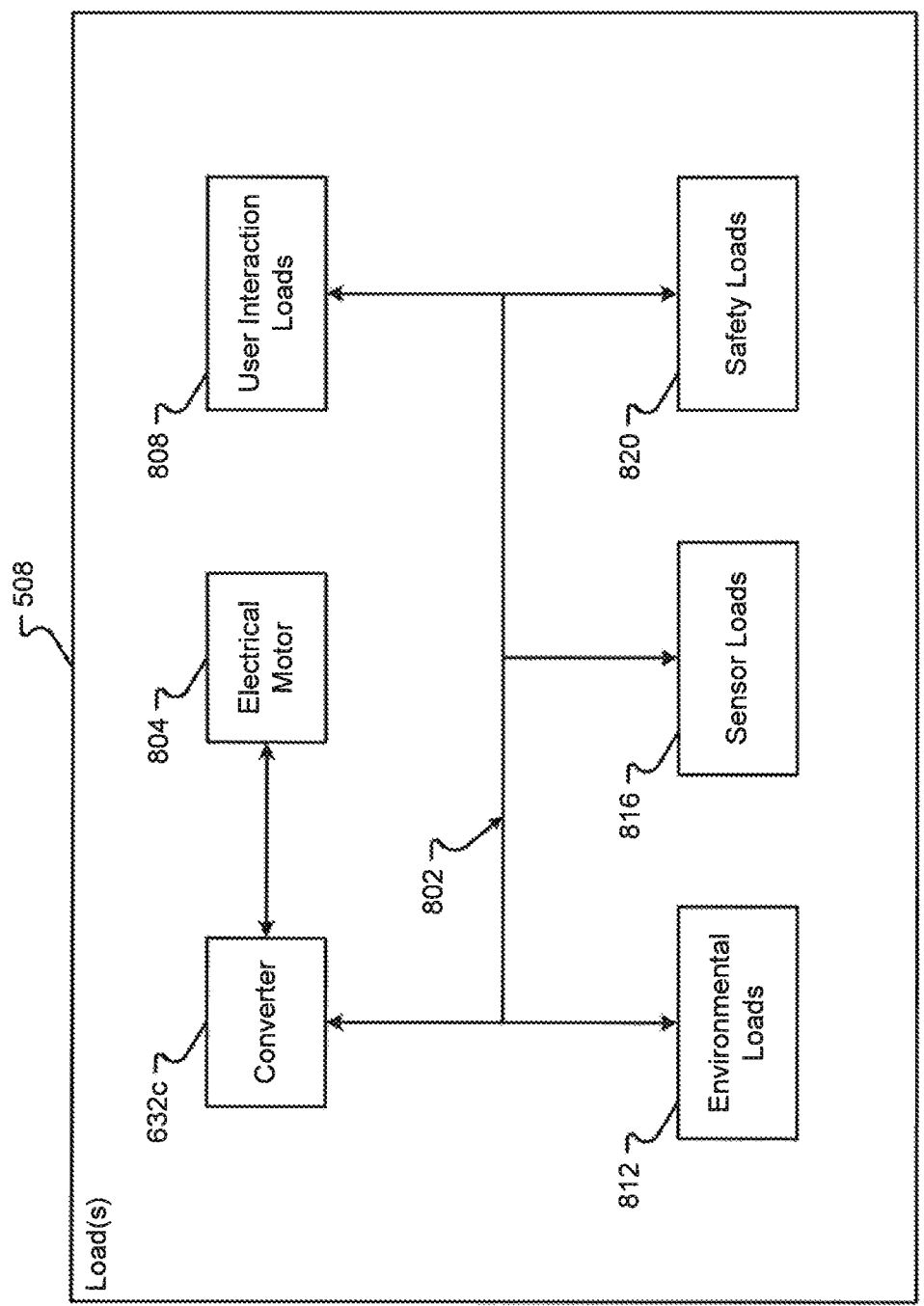
FIG. 8 is a block diagram of an embodiment of loads associated with the electrical system of the vehicle.

An embodiment of one or more loads 508 associated with the vehicle 100 may be as shown in FIG. 8. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508. The converter 632c may be an interface from the power generation unit 504 or the power storage 208 into the loads 508. The converter 632c may be the same or similar to electric converter 632a as shown in FIG. 6. Similar to the discussion of the converter 632b in FIG. 7, the converter 632c may be eliminated, if the electric converter 632a, shown in FIG. 6, is present. However, the converter 632c may further condition or change the energy characteristics for the bus 802 for use by the loads 508. The converter 632c may also provide electrical energy to electric motor 804, which may power the vehicle 100.

The electric motor 804 can be any type of DC or AC electric motor. The electric motor may be a direct drive or induction motor using permanent magnets and/or winding either on the stator or rotor. The electric motor 804 may also be wireless or include brush contacts. The electric motor 804 may be capable of providing a torque and enough kinetic energy to move the vehicle 100 in traffic. In some embodiments, the electric motor 804 may be similar, if not identical, to the electric motor 212 described in conjunction with FIG. 2.

The different loads 508 may also include environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100. The environmental loads 812 can be any loads used to control the environment within the vehicle 100. For example, the air conditioning or heating unit of the vehicle 100 can be environmental loads 812. Other environmental loads can include lights, fans, and/or defrosting units, etc. that may control the environment within, and/or outside of, the vehicle 100. The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
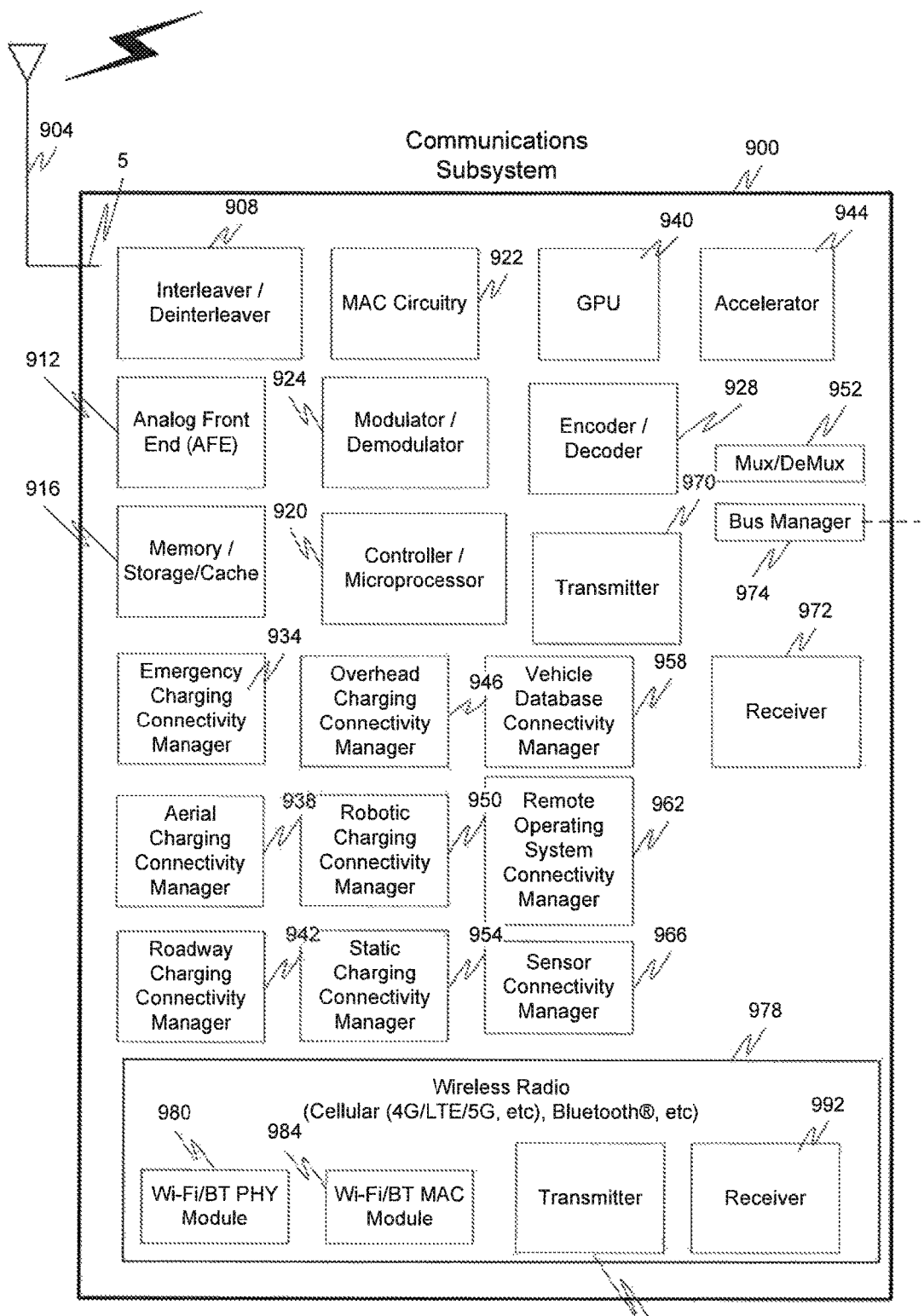
FIG. 9 is a block diagram of an embodiment of a communications subsystem of the vehicle.

FIG. 9 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 900, in addition to well-known componentry (which has been omitted for clarity), includes interconnected elements including one or more of: one or more antennas 904, an interleaver/deinterleaver 908, an analog front end (AFE) 912, memory/storage/cache 916, controller/microprocessor 920, MAC circuitry 922, modulator/demodulator 924, encoder/decoder 928, a plurality of connectivity managers 934-966, GPU 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The device 400 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system in order to convert the analog signal into a digital signal for processing and vice-versa.

The subsystem 900 can also include a controller/microprocessor 920 and a memory/storage/cache 916. The subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long-term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 900 can further include a transmitter 970 and receiver 972 which can transmit and receive signals, respectively, to and from other devices, subsystems and/or other destinations using the one or more antennas 904 and/or links/busses. Included in the subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some embodiments, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the subsystem 900 and one or more of the systems disclosed herein and one or more other devices/systems. The connectivity managers include an emergency charging connectivity manager 934, an aerial charging connectivity manager 938, a roadway charging connectivity manager 942, an overhead charging connectivity manager 946, a robotic charging connectivity manager 950, a static charging connectivity manager 954, a vehicle database connectivity manager 958, a remote operating system connectivity manager 962 and a sensor connectivity manager 966.

The emergency charging connectivity manager 934 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 934 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 938 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 938 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 942 and overhead charging connectivity manager 946 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 950 and static charging connectivity manager 954 can operate in a similar manner to that described herein.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
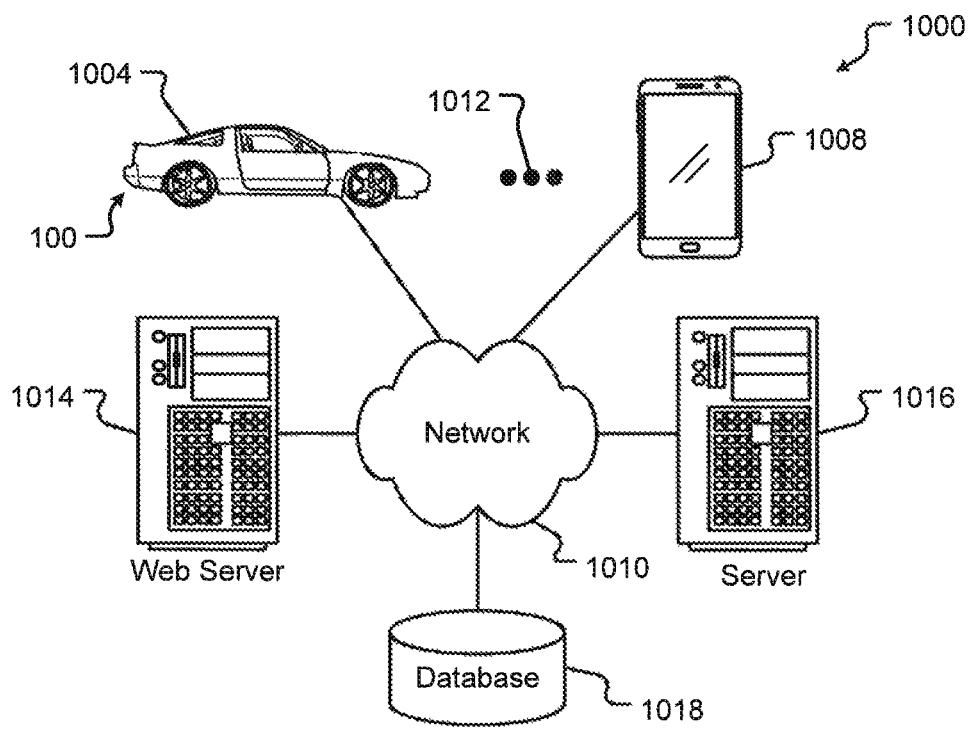
FIG. 10 is a block diagram of a computing environment associated with the embodiments presented herein.

FIG. 10 illustrates a block diagram of a computing environment 1000 that may function as the servers, user computers, or other systems provided and described herein. The environment 1000 includes one or more user computers, or computing devices, such as a vehicle computing device 1004, a communication device 1008, and/or more 1012. The computing devices 1004, 1008, 1012 may include general purpose personal computers (including, merely by way of example, personal computers, and/or laptop computers running various versions of Microsoft Corp.'s Windows® and/ or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server. Although for ease of description, FIG. 10 illustrates a separate web server 1014 and file/application server 1016, those skilled in the art will recognize that the functions described with respect to servers 1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described in FIGS. 1-10.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20i®, that is adapted to store, update, and retrieve data in response to SQL-formatted commands.

Figure 11:
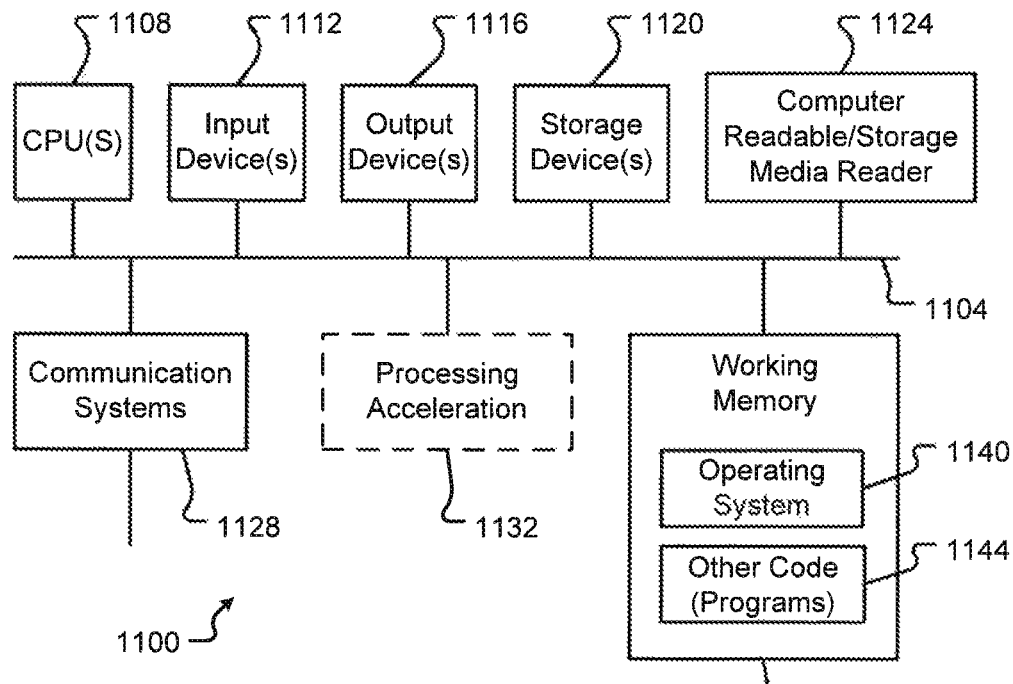
FIG. 11 is a block diagram of a computing device associated with one or more components described herein.

FIG. 11 illustrates one embodiment of a computer system 1100 upon which the servers, user computers, computing devices, or other systems or components described above may be deployed or executed. The computer system 1100 is shown comprising hardware elements that may be electrically coupled via a bus 1104. The hardware elements may include one or more central processing units (CPUs) 1108; one or more input devices 1112 (e.g., a mouse, a keyboard, etc.); and one or more output devices 1116 (e.g., a display device, a printer, etc.). The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., a modem, a network card (wireless or wired), an infra-red communication device, etc.); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer -readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex -A and ARM926EJ-S™ processors, other industry-equivalent processors, and may perform computational functions using any known or future-developed standard, instruction set, libraries, and/or architecture.

Figure 12:
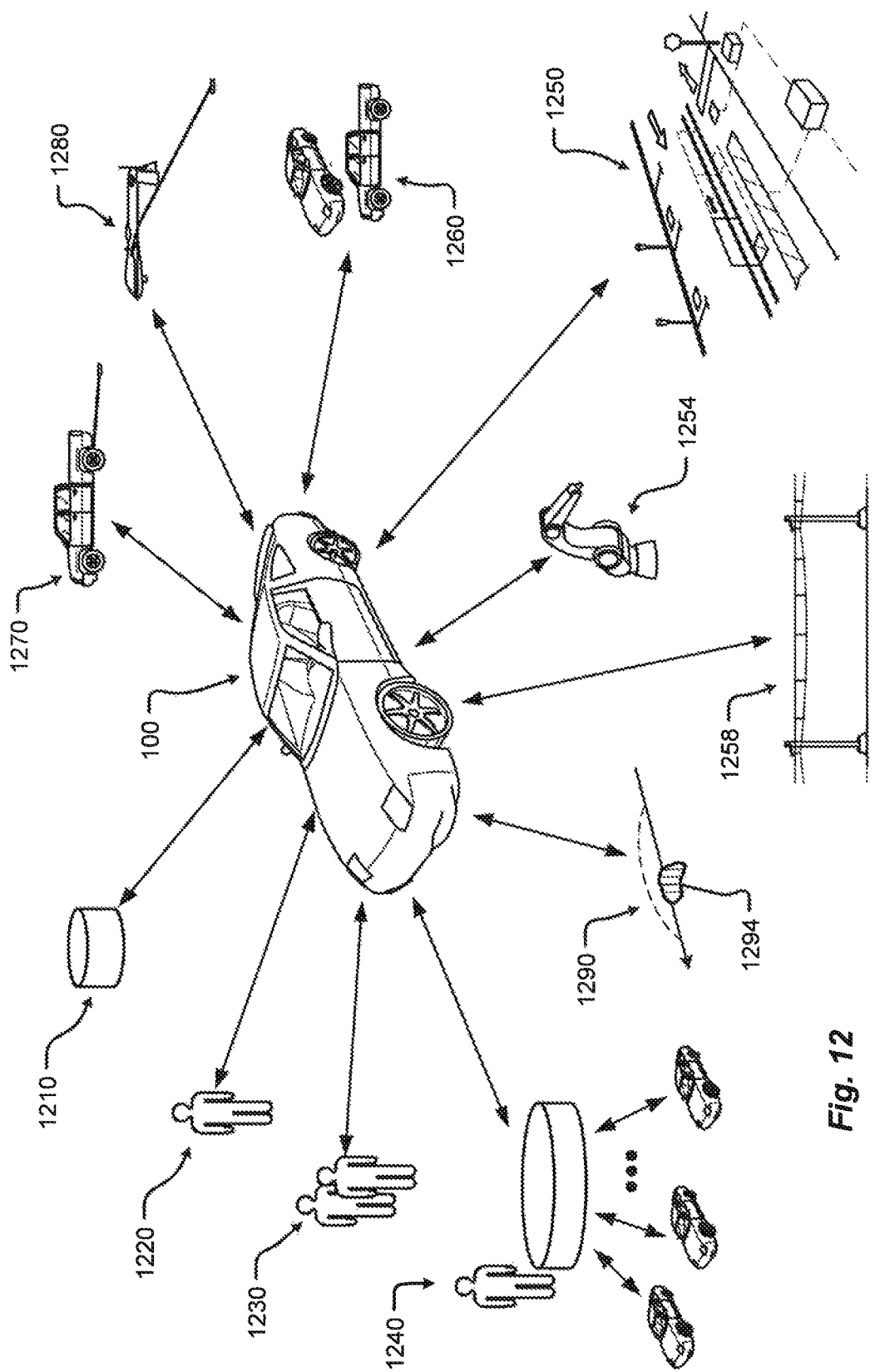
FIG. 12 shows a vehicle in an environment in accordance with embodiments of the present disclosure.

Referring to FIG. 12, the vehicle 100 is shown in a plurality of operational and/or charging environments. The vehicle 100 may operate in any one or more of the depicted environments in any combination. Other embodiments are possible but may not be depicted in FIG. 12. Generally, the vehicle 100 may operate in environments which enable charging of the vehicle 100 and/or operation of the vehicle 100. More specifically, the vehicle 100 may receive a charge via one or more means comprising emergency charging vehicle system 1270, aerial vehicle charging system 1280, roadway system 1250, robotic charging system 1254, and/or overhead charging system 1258. The vehicle 100 may interact and/or operate in an environment comprising one or more other roadway vehicles 1260. The vehicle 100 may engage with elements within the vehicle 100 comprising vehicle driver 1220, vehicle passengers 1230, and/or a vehicle database 1210. In one embodiment, vehicle database 1210 may not physically reside in the vehicle 100 and may instead be accessed remotely (e.g., by wireless communication, etc.), and as such, may reside in another location such as a residence or business location. The vehicle 100 may operate autonomously and/or semi-autonomously in an autonomous environment 1290 (here, depicted as a roadway environment presenting a roadway obstacle 1294 of which the vehicle 100 autonomously identifies and steers the vehicle 100 clear of the obstacle 1294). Furthermore, the vehicle 100 may engage with a remote operator system 1240, which may provide fleet management instructions or control.

In some embodiments, the vehicle 100 may be configured to receive charge via one or more compatible vehicle charging interfaces, such as one or more charging panels and/or interconnections. These compatible vehicle charging interfaces may be configured at one or more locations on, in, or about a vehicle 100. For instance, the locations may include locations on the vehicle 100 wherein charging may be received, via a vehicle roof 130, vehicle side 160 and vehicle lower or undercarriage 140.

Conventionally, accessory ports such as fuel tank lids, caps, charge port doors, etc., may be simple systems utilizing a revolute joint to swing open. Some of the modern electric vehicles may have charge port lids with a different means of swinging open, such as push-push pivoting lids, four bar slide open, linear and rotational combination types, etc. Most of these systems are manually operated. It is an aspect of the present disclosure to provide a completely powered accessory port lid solution.

In one embodiment, when a motor is given a signal to start spinning, a screw cam may be driven by motor to provide a rotational motion. Meanwhile, a guide pin in the housing may be engaged in a helix, or helical groove, disposed on the screw cam. Therefore, as the screw cam is rotated, a counter force may be generated by the guide pin to drive the screw cam to travel linearly. In this case, the lid can follow the screw cam's rotational and linear motions since the lid is rigidly, or fixedly, connected to the screw cam. In some embodiments, the motion of the powered accessory port closure lid opening may provide a lift and rotate motion that, among other things, may cause the lid to separate from a port shroud or access housing a distance in a linear motion and then rotate away from an opening for the port or accessory. For example, the lid may separate and twist away from a center of a port or accessory opening, exposing a vehicle port or accessory.

Figure 13:
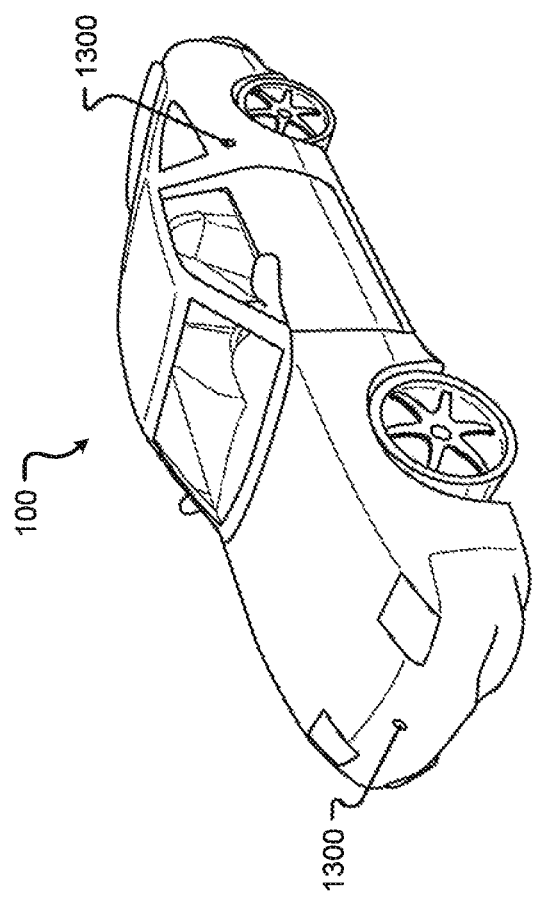
FIG. 13 shows a vehicle with accessory ports in accordance with embodiments of the present disclosure.

FIG. 13 shows vehicle 100 with accessory ports 1300 in accordance with embodiments of the present disclosure. Vehicle 100 may comprise one or more accessory port(s) 1300, such as to facilitate access to connection or service components of vehicle 100, such as a charging plug, charging cord, fuel tank, diagnostic port, etc. Accessory port 1300 may selectively prevent exposure of an internal component of vehicle 100, such as the charging plug, charging cord, etc., when such access to such internal components are not need and/or to protect persons and property. Additionally, accessory port 1300 may allow for a more aerodynamic form of vehicle 100 as would otherwise be provided by the exposure of such internal components of vehicle 100 to the air and resulting drag, as compared to when accessory port 1300 is closed.

In other embodiments, accessory port 1300 may be utilized within the interior of vehicle 100, such as to conceal/reveal a user-device connection port (e.g., cell phone charging port, power port, etc.), infotainment connection, or other component of vehicle 100.

In another embodiment, accessory port 1300 may provide an automatic and/or automated means to reveal/conceal the connections or service components of vehicle 100. For example, a human, such as driver 1220, or an automated system, such as robotic charging system 1254 may signal vehicle 100 to open/close accessory port 1300 to allow access to the internal component of vehicle 100.

In another embodiment, accessory port 1300 may automatically open/close to selectively provide/conceal access to an internal component of vehicle 100. For example, vehicle 100, when autonomous or operating in an autonomous mode, may engage external systems, such as robotic charging system 1254, without requiring human intervention. Human operation of accessory port 1300 may be provided via a button, switch, voice command, or other input, such as to input device 1112 of computer system 1100, for processing by CPU 1108, and providing an output to accessory port 1300 to perform an operation (e.g., open if closed, close if open, stop, reverse, resume, etc.).

Figure 14:
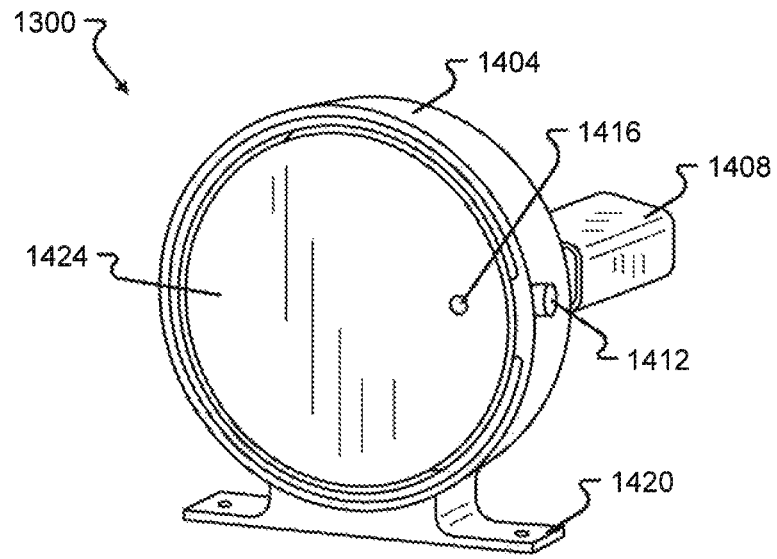
FIG. 14 shows an accessory port in a closed configuration in accordance with embodiments of the present disclosure.

FIG. 14 shows accessory port 1300 in a closed configuration in accordance with embodiments of the present disclosure. In one embodiment, accessory port 1300 comprises portions to enable mounting, such as within the surface of body panel 108 of vehicle 100. Accessory port 1300 may be mounted (e.g., welded, bolted, screwed, riveted, etc.) by attachment to vehicle 100 via housing 1404 and/or base 1420. Base 1420 may be utilized to mount accessory port 1300 to a frame or chassis portion of vehicle 100 or omitted when accessory port 1300 is mounted solely by housing 1404 or other mounting means.

In another embodiment, accessory port 1300 comprises lid 1424 which is lifted (e.g., moved away from housing 1404) and rotated by attachment 1416 (e.g., revealing the interior of vehicle 100 behind accessory port 1300). Guide pin 1412 translates rotational force of a motor (see, for example, motor 1808 of FIGS. 18 and 19), within motor support 1408, partially into a longitudinal force, such as to simultaneously rotate and lift lid 1424 with a single rotational force.

Figure 15:
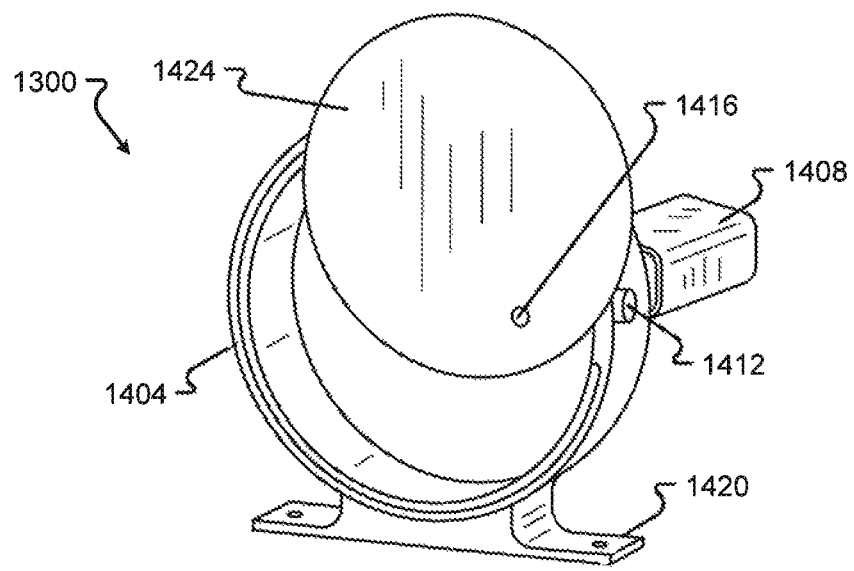
FIG. 15 shows an accessory port in a partially opened configuration in accordance with embodiments of the present disclosure.

FIG. 15 shows accessory port 1300 in a partially opened configuration in accordance with embodiments of the present disclosure. In one embodiment, the motor within motor support 1408 has partially operated to cause lid 1424 to be partially opened, such as when transitioning between an open state and a closed state of lid 1424. In addition to being rotated, lid 1424 has been lifted, or moved, to distance lid 1424 from housing 1404, as will be described more completely with respect to FIG. 20.

Figure 16:
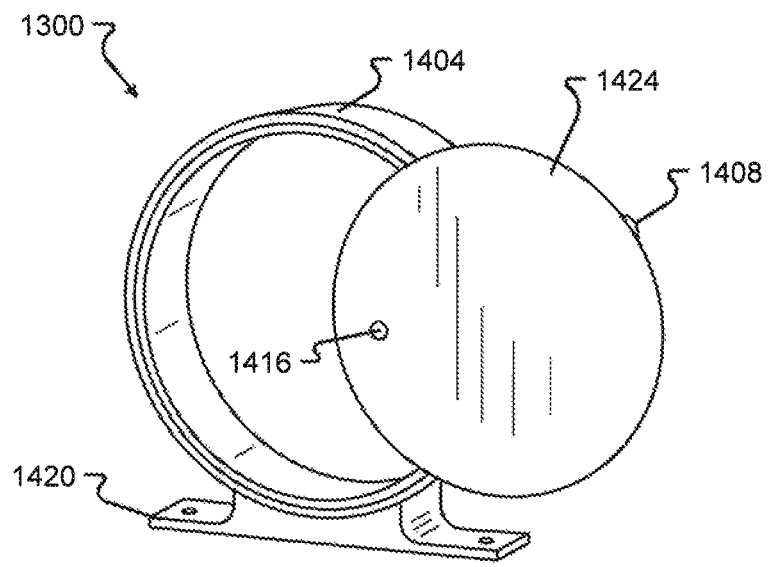
FIG. 16 shows an accessory port in an opened configuration in accordance with embodiments of the present disclosure.

FIG. 16 shows accessory port 1300 in an opened configuration in accordance with embodiments of the present disclosure. In one embodiment, the motor within motor support 1408 has fully operated to cause lid 1424 to be fully opened. In addition to being rotated, lid 1424 has been lifted, or moved, to distance lid 1424 from housing 1404, as will be described more completely with respect to FIG. 20.

Figure 17:
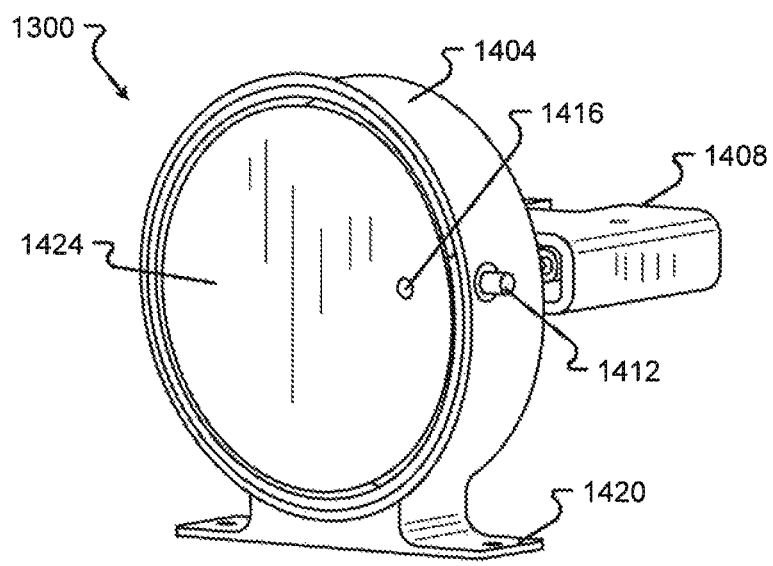
FIG. 17 shows an oblique front-view of an accessory port in a closed configuration in accordance with embodiments of the present disclosure.

FIG. 17 shows an oblique front-view of accessory port 1300 in a closed configuration in accordance with embodiments of the present disclosure. In one embodiment, the motor within motor support 1408 has fully operated to cause lid 1424 to be fully closed. In addition to being rotated, lid 1424 has been lowered to reduce, or otherwise close, the distance between lid 1424 and housing 1404, as will be described more completely with respect to FIG. 20. Lid 1424, in the closed configuration may provide an air gap between lid 1424 and housing 1404 or entirely or partially seat lid 1424 on to an edge of housing 1404.

Figure 18:
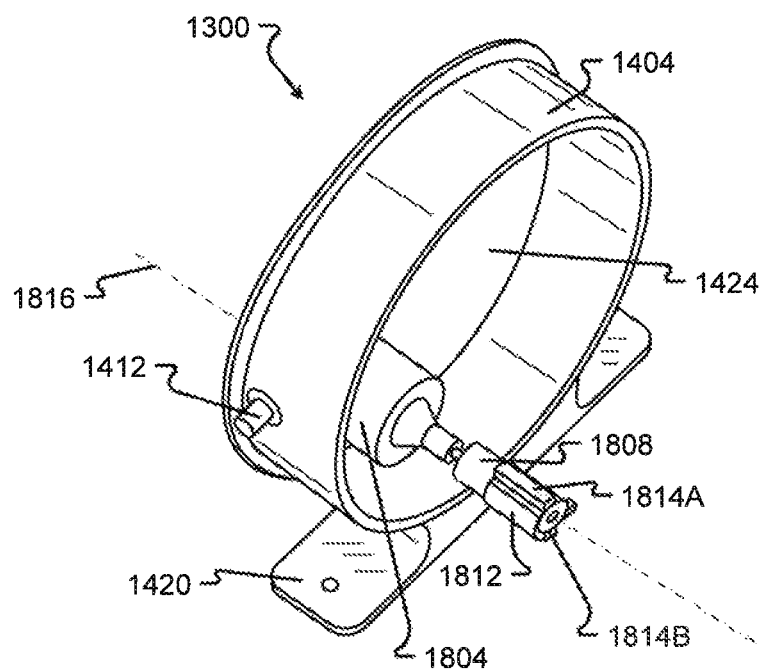
FIG. 18 shows an oblique top-rear view of an accessory port in a closed configuration in accordance with embodiments of the present disclosure.

FIG. 18 shows an oblique top-rear view of accessory port 1300 in a closed configuration in accordance with embodiments of the present disclosure. In one embodiment, motor 1808 provides a rotational force to screw cam 1804. Screw cam 1804 engages with guide pin 1412 to translate a portion of the rotational force into a longitudinal force to lift lid 1424, causing lid 1424 to travel away from housing 1404 along longitudinal axis 1816, when rotated in one direction, or lower, when rotated in another direction. In one embodiment, motor 1808 is rotated in one direction, when energized with a first current flow, and rotated in the opposite direction, when energized with an opposite current flow. Longitudinal axis 1816 is offset from the center of lid 1424 such that a rotation along longitudinal axis 1816 cause at least a portion of lid 1424 to expose the interior of accessory port 1300, when opened.

In another embodiment, motor 1808, via attachment to screw cam 1804 and the engagement of cam channel 1412 of screw cam 1804 with guide pin 1412, is longitudinally pulled or pushed along longitudinal axis 1816, depending on the direction of rotation of motor 1808. The rotation of motor 1808 itself (e.g., the housing, case, etc.) is restrained by motor sliding coupler 1812 comprising guides 1814, such as guides 1814A-B, engaging motor support 1408 comprising channels, as discussed more completely with respect to FIG. 18. Accordingly, motor 1808, screw cam 1804, and lid 1424, may longitudinally move based on the rotation of motor 1808.

Figure 19:
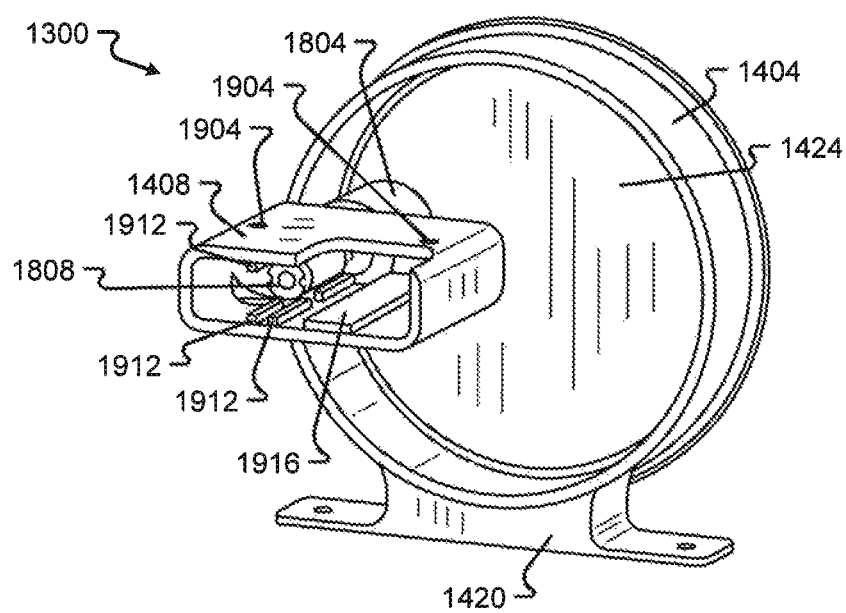
FIG. 19 shows an oblique rear view of an accessory port in a closed configuration in accordance with embodiments of the present disclosure.

FIG. 19 shows an oblique rear view of accessory port 1300 in a closed configuration in accordance with embodiments of the present disclosure. In one embodiment, accessory port 1300 comprises motor support 1408. Motor support 1408 comprises channel guides 1912, which in turn engage guides 1800 of motor sliding coupler 1812, thereby allowing motor 1808 to be restricted from rotating itself but allowed to freely slide within motor support 1408, and thereby allow attached cam 1804 and lid 1424 to be rotated and lifted/lowered from housing 1404. Motor support 1408 may be mounted via screws, bolts, or other fasteners, such as via support openings 1904.

Figure 21A:
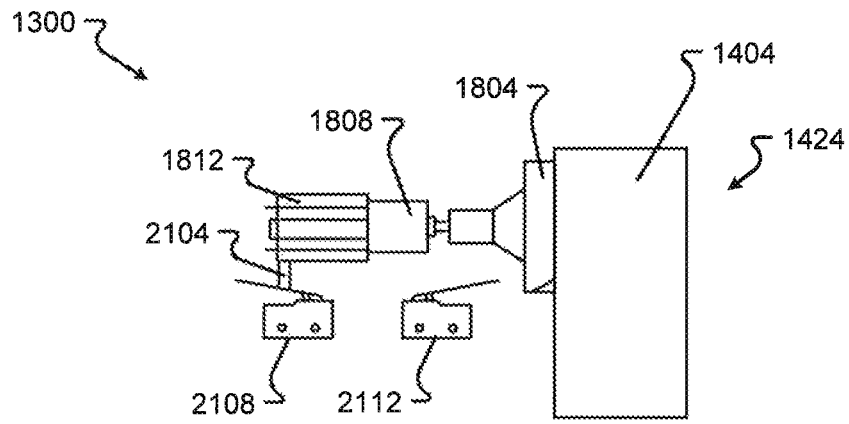
FIGS. 21A-C show a side view of an accessory port and slide-mounted motor in accordance with embodiments of the present disclosure.
Figure 21B:
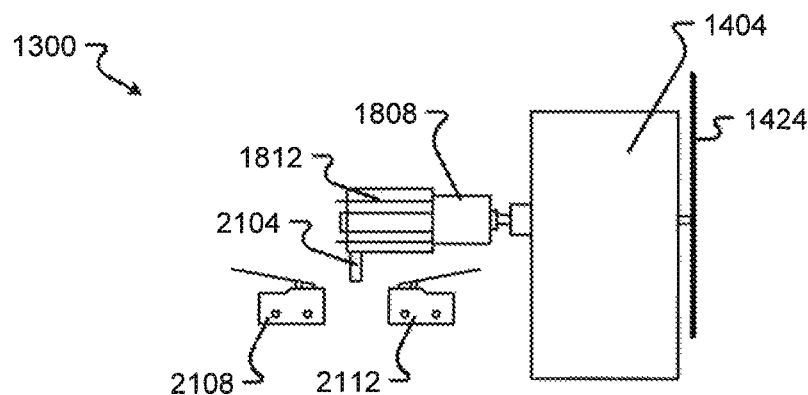
Figure 21C:
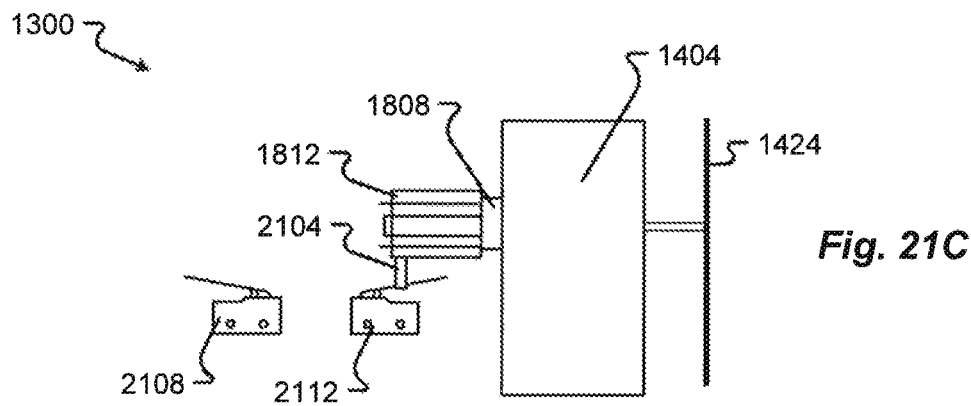

In another embodiment, limit switch mount 1916 is provided to facilitate the mounting of limit switches 2108, 2112 (see, FIGS. 21A-C). It should be appreciated that motor 1808 is electrically powered via electrical connections, not shown to avoid unnecessarily complicating the figures. However, in other embodiments, pneumatic or hydraulic power may be utilized when motor 1808 is configured to be operated via air or hydraulic force, without departing from the scope of certain embodiments.

In yet another embodiment, motor 1808 is fixed such that motor 1808 itself (e.g., housing, case, etc.) neither rotates nor slides, however, screw cam 1804 is attached to a shaft of motor 1808, such as via splines, to allow screw cam 1804, and attached lid 1424, to slide along the shaft and thereby move longitudinally along longitudinal axis 1816 when motor 1808 is energized.

Figure 20:
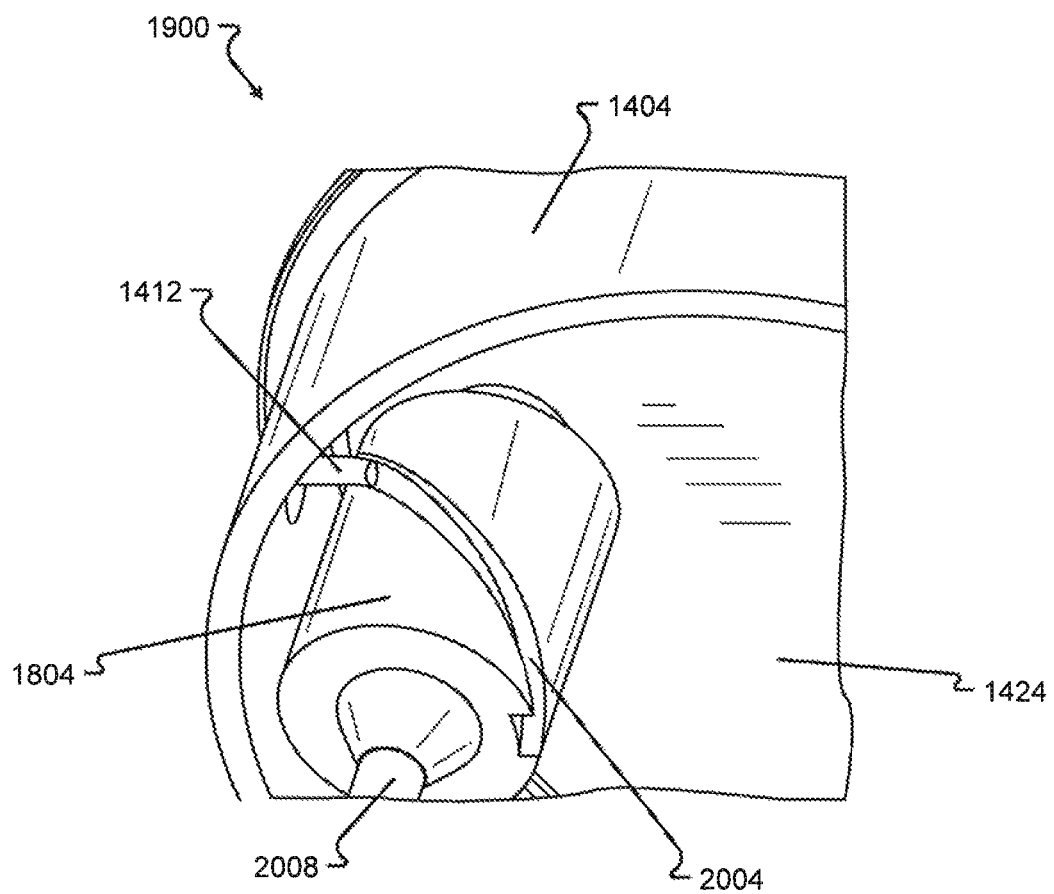
FIG. 20 shows an oblique partial rear view of an accessory port in a closed configuration in accordance with embodiments of the present disclosure.

FIG. 20 shows an oblique partial rear view of an accessory port 1300 in a closed configuration in accordance with embodiments of the present disclosure. In one embodiment, accessory port 1300 comprises guide pin 1412 configured to engage cam channel 2004 of screw cam 1804. Cam screw 1804 being driven by shaft 2008 which, in turn, is rotated by motor 1808 (see, for example, FIG. 18). Cam channel 2004 may be a helix, helical groove, or portion thereof.

As shaft 2008 is rotated and, in turn, rotates screw cam 1804, guide pin 1412 engages cam channel 2004 to lift lid 1424 away from housing 1404 while, at the same time, rotating lid 1424. Cam channel 2004 may be at a uniform angle to the longitudinal axis of screw cam 1804, such that the amount of lift provided to lid 1424 is uniform for any unit of rotation of screw cam 1804. In another embodiment, cam channel 2004 may be at varying degrees of angle to the longitudinal axis of screw cam 1804, such that a given a unit of rotation may provide increased (or decreased) lift at certain portions of the operation of accessory port 1300 for a given amount of rotation. For example, an initial portion of cam channel 2004 may comprise a steeper angle, such that the initial opening of lid 1424 provides greater lift away from housing 1404 for a given amount of rotation, as compared to a subsequent portion that provides a lesser (or greater) degree of lift for the same amount of rotation.

FIGS. 21A-B show side view of an accessory port 1300 and slide-mounted motor 1808 in accordance with embodiments of the present disclosure. In one embodiment, motor sliding coupler 1812, motor 1808, and screw cam 1804 are mounted within motor support 1408 to slide longitudinally therein. FIG. 21A illustrates lid 1424 in a closed configuration within housing 1404. Extension 2104 engages retract-limit switch 2108 such that an electrical (or other source of energy to motor 1808) may only energize an extension circuit to cause motor 1808 to rotate in a manner configured to open lid 1424 (concealed inside of housing 1404 with respect to FIG. 21A). A retraction circuit, if energized would cause motor 1808 to rotate in a direction associated with closing lid 1424, is opened and thereby made inoperable when extension 2104 engages retract- -limit switch 2108. Retract-limit switch 2108 and/or extension-limit switch 2112 may be mounted on limit switch mount 1820 (see, FIG. 18).

In another embodiment, illustrated by FIG. 21B, motor sliding coupler 1812, motor 1808, and screw cam 1804 are in a transitional configuration (e.g., between open and closed) whereby extension 2104 engages neither retract-limit switch 2108 or extent-limit switch 2112. Accordingly, a circuit that would cause motor 1808 to rotate in a manner associated with opening lid 1424 may be energized, as well as, a circuit that would cause motor 1808 to rotate in a manner associated with closing lid 1424 may also be energized.

FIG. 21C illustrates lid 1424 in an open configuration within housing 1404. Extension 2104 engages extension-limit switch 2112 such that an electrical (or other source of energy to motor 1808) may only energize a retraction circuit to cause motor 1808 to rotate in a manner configured to close lid 1424. An extension circuit, if energized would cause motor 1808 to rotate in a direction associated with opening lid 1424, is opened and thereby made inoperable when extension 2104 engages extension-limit switch 2112.

In another embodiment, accessory port 1300 omits one or both of retract-limit switch 2108 and extension-limit switch 2112. Alternatively, motor 1808 may be a stepper motor, or other indexed or known rotational motor, and provided with a signal to cause a directional rotation of a fixed amount to open or close lid 1424 without requiring a limit switch(es).

Figure 22:
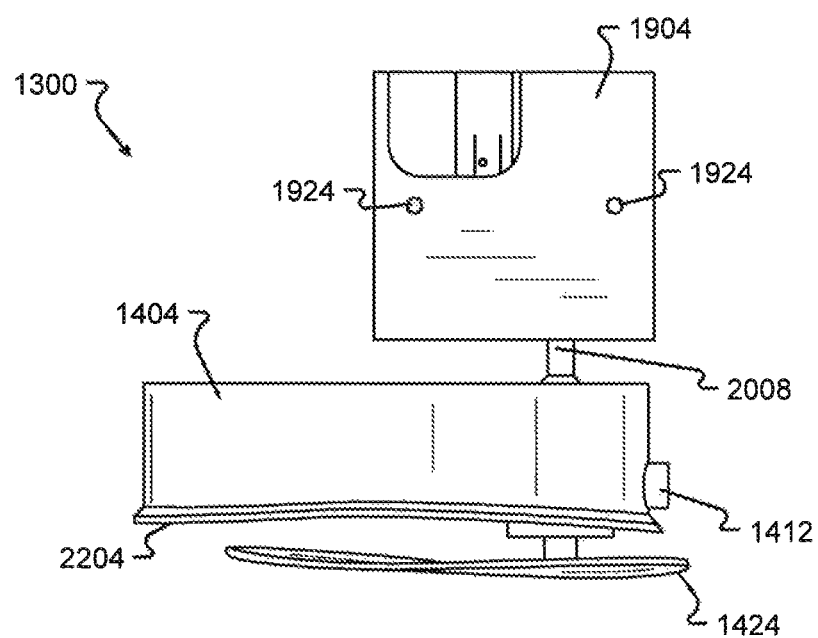
FIG. 22 shows a top view of an accessory port in a partially opened configuration in accordance with embodiments of the present disclosure.

FIG. 22 shows a top view of an accessory port in a partially opened configuration in accordance with embodiments of the present disclosure. In one embodiment, accessory port 1300 is operated to selectively open or close lid 1424. Shaft 2008 is rotated by motor 1808 (concealed within motor support 1408), which may be mounted, such as with screws, bolts, etc., engaging in mounting support openings 1924. To reduce the sliding force between lid 1424 and seat 2204 of housing 1404, lid 1424 may be curved to allow a more tangential contact with reduced rotational forces as lid 1424 engages (or disengages) seat 2204, in particular the contact is more tangential as compared embodiments where lid 1424 and seat 2204 are flat and coplanar-aligned. The curve of lid 1424, and associated seat 2204, may be curved, partially curved, arcuate, or a more complex curve, such as a hyperbolic paraboloid.

Figure 23:
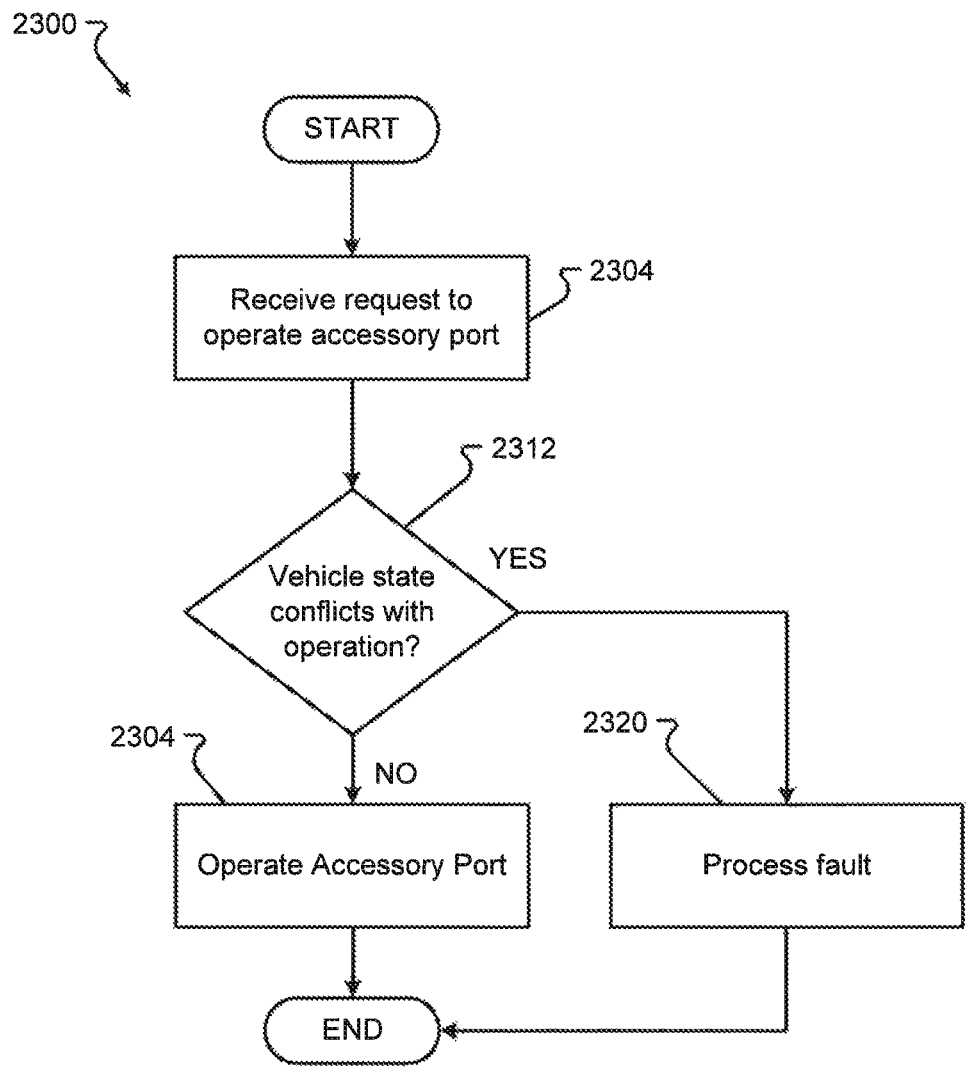
FIG. 23 shows a first process in accordance with embodiments of the present disclosure.

FIG. 23 shows process 2300 in accordance with embodiments of the present disclosure. In one embodiment, process 2300 begins with step 2304 receiving a request to operate accessory port 2304. The request may be via human input, such as passenger 1230 and/or drive 1220 providing a tactile, voice, or other input to input device 1112. Additionally or alternatively, the request may originate from an automated system, such as one executing on CPU(s) 1108, or an external system, such as robotic charging system 1254 communicate with vehicle 100 via communications subsystem 900.

Next, step 2312 determines if a state of vehicle 100 conflicts with the operation request. For example, if vehicle 100 is currently being operated on a roadway and the request received at step 2304 is associated with opening accessory port 1300 which conceals a gasoline filler neck, such an operation may be determined to be in conflict (e.g., assuming on-the-fly fueling is not enabled). Accordingly, step 2312 may be determined in the affirmative and step 2320 processes the request received at step 2304 as a fault. For example, a feedback to the requesting entity that such an operation is not currently permitted. However, accessory port 1300 may conceal a personal device charging port and be consistent with normal operation of vehicle 100. Accordingly, step 2312 may be determined in the negative and step 2304 then operates accessory port 1300 as requested in step 2304.

In another embodiment, records may be stored in a repository, such as working memory 1136, database 1018, storage device 1120, etc., comprising features and operational attributes of vehicle 100 and associated conflicting states. For example, vehicle 100 may be an electric vehicle and currently connected to an external power source (e.g., robotic charging system 1254, etc.) and have at least one record indicating that accessory port 1300, associated with a charging plug, cannot be closed while charging is ongoing. Once charging is discontinued and the cord removed from the plug within accessory port 1300, operating accessory port 1300 may then be permitted. In another embodiment, removal of the plug may initiate operation of the accessory port 1300 to automatically close lid 1424 upon the cord being removed.

Figure 24:
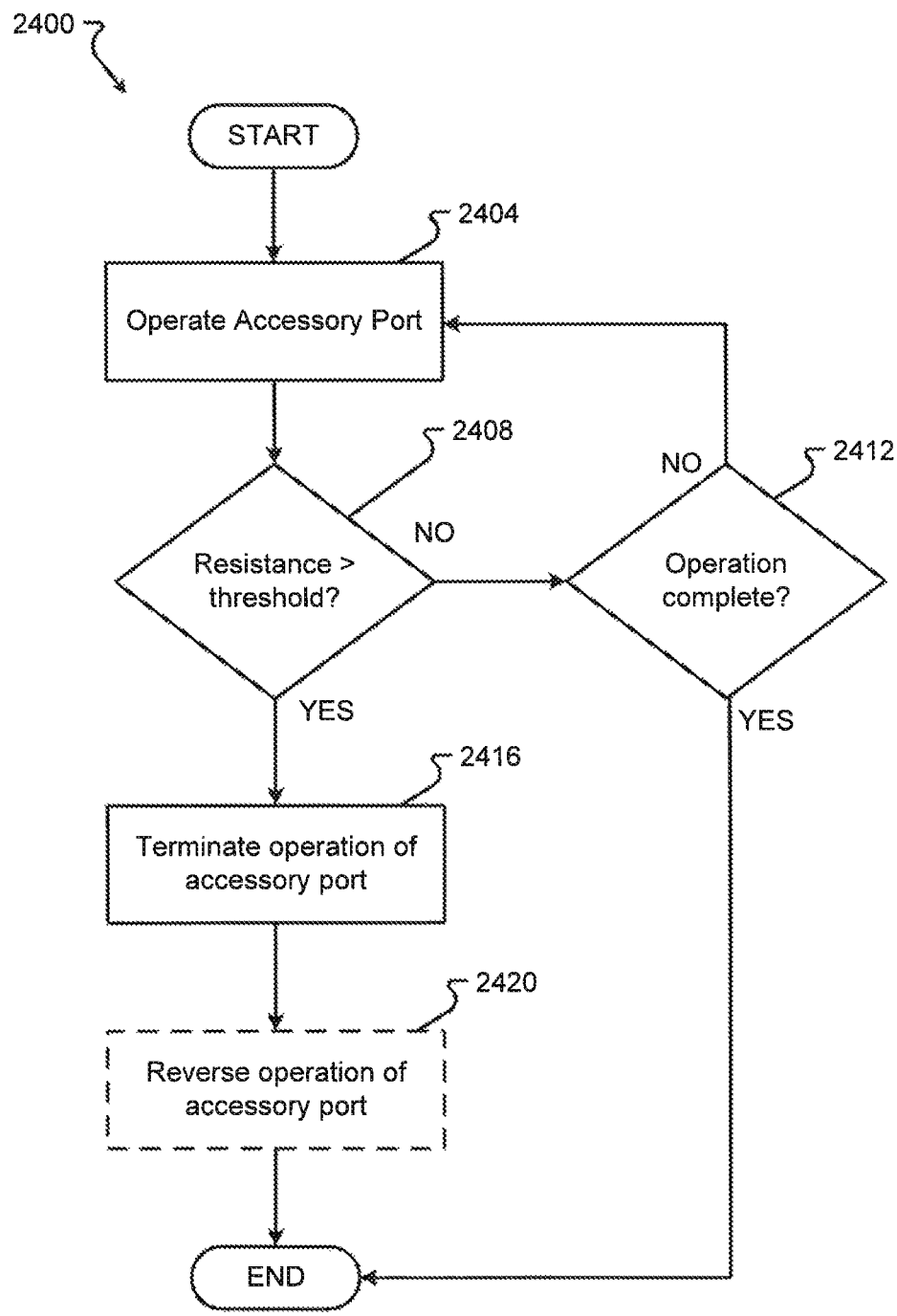
FIG. 24 shows a second process in accordance with embodiments of the present disclosure.

FIG. 24 shows process 2400 in accordance with embodiments of the present disclosure. In one embodiment, step 2404 operates accessory port 1300. Step 2408 determines if a resistance, such as a power demand of motor 1808, force meter, deformation, etc., is above a threshold, such as a resistance associated with a blockage of lid 1424. If step 2408 is determined in the negative, step 2412 may then determine if the operation is complete. Step 2412 may operate until a circuit is opened, such as by extension 2401 engaging extension-limit switch 2112 or retraction-limit switch 2108. Alternatively, step 2412 may operate until motor 1808, when embodied as a stepper motor, has completed the requested rotation. If step 2412 is determined in the affirmative, process 2400 may end. If step 2412 is determined in the negative, process 2400 continues and step 2404 continues to operate accessory port 1300. If step 2408 is determined in the affirmative, processing continues to step 2416.

In one embodiment, step 2416 terminates operation of accessory port 1300. For example, step 2404 may attempt to close accessory port 1300 when opened to allow access to a charging plug. Operating accessory port 1300 to close it, and close it on a charging cord, may cause a resistance whereby step 2408 is determined to be above a threshold and, in step 2416, operation of accessory port 1300 terminated. Optionally, step 2420 may reverse operation of accessory port 1300.

Figure 25:
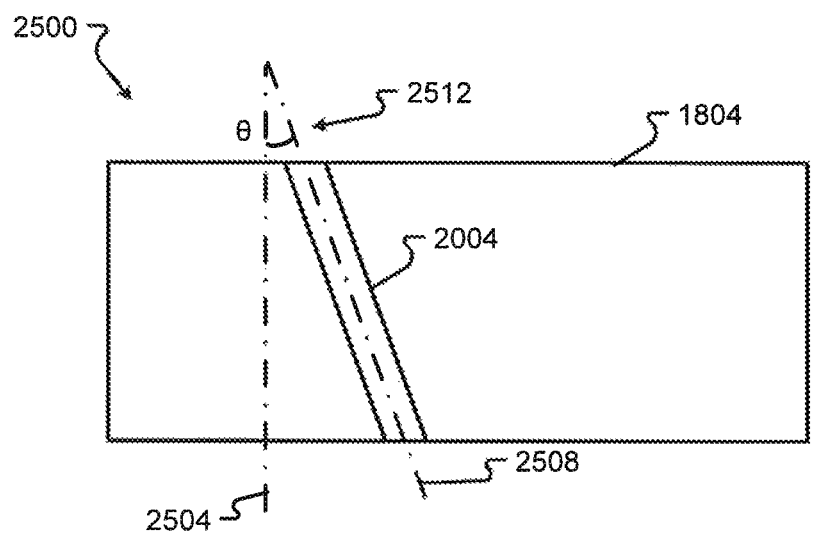
FIG. 25 shows a first unfolded view of a screw cam in accordance with embodiments of the present disclosure.

FIG. 25 shows unfolded view 2500 of screw cam 1804 in accordance with embodiments of the present disclosure. In one embodiment, screw cam 1804 is coaxially aligned with longitudinal axis 1816 (see FIG. 18) and illustrated as if unfolded to provide a view of the surface of screw cam 1804 that is, or is substantially, parallel to longitudinal axis 1816. In one embodiment, cam channel 2004 forms a uniform angle ("θ") 2512 along the entirety of cam channel 2004. Uniform angle 2512 may be determined by the angle between cam channel 2004 and parallel reference line 2504, parallel to longitudinal axis 1816. As a result, the embodiment illustrated in view 2500 provides a uniform lifting action to lid 1524 for each unit of rotation of screw cam 1804. As a result, the embodiment illustrated in view 2500 provides a constant lifting action to lid 1524 for each unit of rotation of screw cam 1804 regardless of which portion of cam channel 2004 guide pin 1412 is presently engaged with. The uniform angle 2412 being between, but not including, parallel to parallel reference line 2504 and perpendicular to parallel reference line 2504.

Figure 26:
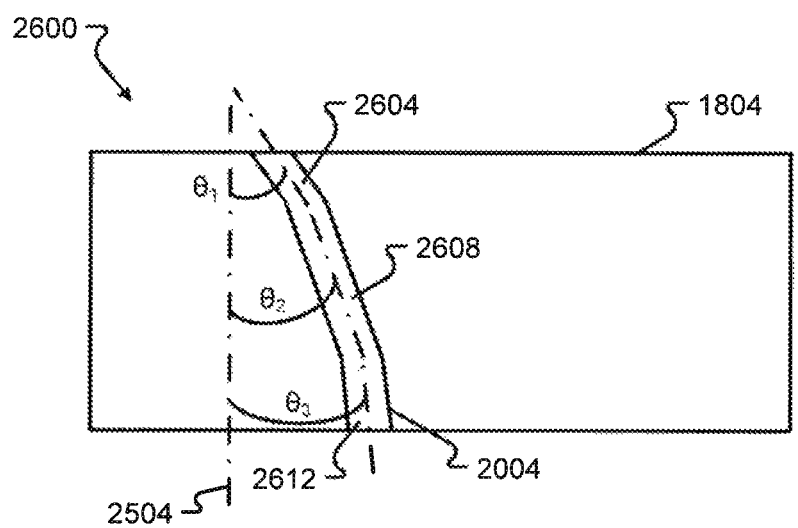
FIG. 26 shows a second unfolded view of a screw cam in accordance with embodiments of the present disclosure.

FIG. 26 shows unfolded view 2600 of screw cam 1804 in accordance with embodiments of the present disclosure. In one embodiment, screw cam 1804 is coaxially aligned with longitudinal axis 1816 (see FIG. 18) and illustrated as if unfolded to provide a view of the surface of screw cam 1804 that is, or is substantially, parallel to longitudinal axis 1816. In one embodiment, cam channel 2004 forms first variable angle ("θ$_1$") 2604, second variable angle ("θ$_2$") 2608, and third variable angle ("θ$_3$") 2612 along portions of cam channel 2004. Variable angles 2604, 2608, and 2608 may be determined by the angle between their respective portion of cam channel 2004 and parallel reference line 2504, parallel to longitudinal axis 1816. As a result, the embodiment illustrated in view 2600 provides a variable lifting action to lid 1524 for each unit of rotation of screw cam 1804 depending on which portion forming first variable angle 2604, second variable angle 2608, or third variable angle 2612 of cam channel 2004 guide pin 1412 is presently engaged with.

At least one of first variable angle 2604, second variable angle 2608, and third variable angle 2612 being between, but not including, parallel to parallel reference line 2504 and perpendicular to parallel reference line 2504. In the present embodiment, cam channel 2004 is described with respect to three portions forming first variable angle 2604, second variable angle 2608, and third variable angle 2612, however, it should be appreciated that fewer, such as two variable angles, or more such as four or more variable angles may be utilized without departing from the scope of the embodiment. Similarly, while the transition between portions (e.g., first variable angle 2604 and second variable angle 2608) are illustrated as being abrupt transition, the transition may be smooth, such as to form a curve and/or variable curve.

In another embodiment, the threshold utilized in step 2408 may be determined based upon known or likely environmental factors. For example, accessory port 1300 may be an external portion of vehicle 100 (e.g., an external charging port). Accordingly, a resistance to operating accessory port 1300 may be increased due to wind, ice, dirt, or other environmental factors. Such factors may determine, at least in part, the resistance threshold.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an accessory port, comprising: a motor comprising a shaft and configured to rotate the shaft when energized; a screw cam attached to the shaft and comprising a cam channel traversing the exterior of the screw cam partially rotationally traversing the exterior of the screw cam and partially longitudinally traversing the exterior of the screw cam; a housing, comprising a guide pin engaging the cam channel; and a lid attached to the screw cam; and wherein the motor, in response to being energized to rotate the shaft a first direction, provides a rotational force to the screw cam, the cam channel engaging the guide pin to translate a portion of the rotational force into a longitudinal force and thereby cause the lid to simultaneously be lifted away from the housing and rotated along the longitudinal axis.

Embodiments include a method, comprising: energizing a motor with a first current flow to cause the motor to rotate a shaft a first direction, the shaft being coaxially aligned with a longitudinal axis; wherein the rotation of the shaft further rotates a screw cam comprising a cam channel disposed at an angle to the longitudinal axis along the exterior of the screw cam and engaging a fixed guide pin; wherein the rotation of the screw cam, via engagement of the cam channel with the guide pin fixed in a housing, converts a portion of the rotation into a longitudinal force and thereby causes the screw cam to travel along the longitudinal axis; wherein the screw cam transfers the rotational force and longitudinal force to a lid attached thereto and thereby cause the lid to both rotate and travel away from the housing.

Embodiments include an autonomous driving system, comprising: a powered accessory port, the powered accessory port comprising a lid selectively concealing an interior portion of the powered accessory port; a processor configured to receive an input and, in response to the input, energize a motor of the powered accessory port; and wherein the motor, when energized, provides a rotational force to a screw cam having disposed thereon a cam channel engaging a guide pin fixed to a housing of the powered accessory port and converting a portion of the rotational force of the motor to a longitudinal force and thereby lift and rotate a lid attached to the screw cam.

Aspects of the above accessory port, method, and autonomous driving system include:

A motor housing, the motor housing further comprising a channel; and wherein the motor further comprises a motor sliding coupler, the motor sliding coupler further comprising a guide; wherein the guide engages the channel to rotationally constrict the motor and facilitate longitudinal travel of the motor.

Wherein the lid is curved to cause seating of the lid with the housing to be more tangential than when lid and housing are coplanar.

Wherein the lid is a hyperbolic paraboloid.

A retract-limit switch; and an extension to engage the retract-limit switch when the lid is closed; and wherein the retract-limit switch opens a circuit to prevent the motor from being energized to rotate in a direction associated with closing the lid, when the retract-limit switch is engaged.

An extension-limit switch; and an extension to engage the extension-limit switch when the lid is open; and wherein the extension-limit switch opens a circuit to prevent the motor from being energized to rotate in a direction associated with opening the lid, when the extension-limit switch is engaged.

Wherein the lid is rotated along a longitudinal axis offset from the center of the lid.

Wherein the cam channel comprises varying angles, relative to the longitudinal axis, along the screw cam to vary the amount of longitudinal travel in relation to a fixed unit of rotational motion.

Wherein the motor, upon encountering a resistance to motion greater than a previously determined threshold, terminates operation.

Further comprising having the accessory port mounted to a vehicle for operation by a processor of the vehicle.

Wherein the motor is further fixed longitudinal axis and the screw cam is configured to slide along the shaft of the motor when rotated and the cam channel engages the guide pin.

Energizing the motor with a second current flow, opposite of the first current flow, to cause the motor to rotate the shaft in a second direction; and wherein the screw cam transfers the rotational force and longitudinal force to the lid attached thereto and thereby cause the lid to both rotate and travel towards the housing.

Measuring a force exerted by the motor; determining whether the force is above a previously determine threshold; and upon determining the force is above the previously determined threshold, de-energizing the motor with respect to the first current flow.

Engaging a limit switch upon the travel of the screw cam reaching a previously determined limit; and wherein the limit switch, when engaged, opens a circuit that de-energizes the motor with respect to the second current flow.

Upon determining the force is above the previously determined threshold, energizing the motor with a second current flow opposite of the first current flow.

Engaging a limit switch upon the travel of the screw cam reaching a previously determined limit; and wherein the limit switch, when engaged, opens a circuit that de-energizes the motor with respect to the first current flow.

A communication interface to receive a request for access to the interior portion of the powered accessory port; and wherein the communication interface provides the request as the input, to the processor.

The interior portion of the powered accessory port houses a connection for charging an electrical storage component powering a vehicle; the communication interface receives the request for access from an automated charging system; and in response to the request, the powered accessory port is energized to allow the automated charging system access to the connection.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on-board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on-board rechargeable energy storage, including electric vehicles and hybrid electric vehicles.

What is claimed is:

1. An accessory port, comprising:
   a motor comprising a shaft and configured to rotate the shaft when energized;
   a screw cam attached to the shaft and comprising a cam channel traversing the exterior of the screw cam partially rotationally traversing the exterior of the screw cam and partially longitudinally traversing the exterior of the screw cam;
   a housing, comprising a guide pin engaging the cam channel; and
   a lid attached to the screw cam;
   wherein the motor, in response to being energized to rotate the shaft a first direction, provides a rotational force to the screw cam, the cam channel engaging the guide pin to translate a portion of the rotational force into a longitudinal force and thereby cause the lid to simultaneously be lifted away from the housing and rotated along the longitudinal axis.

2. The accessory port of claim 1, further comprising:
   a motor housing, the motor housing further comprising a channel;
   wherein the motor further comprises a motor sliding coupler, the motor sliding coupler further comprising a guide; and
   wherein the guide engages the channel to rotationally constrict the motor and facilitate longitudinal travel of the motor.

3. The accessory port of claim 1, wherein the lid is curved to cause seating of the lid with the housing to be more tangential than when lid and housing are coplanar.

4. The accessory port of claim 1, wherein the lid is a hyperbolic paraboloid.

5. The accessory port of claim 1, further comprising:
   a retract-limit switch;
   an extension to engage the retract-limit switch when the lid is closed; and
   wherein the retract-limit switch opens a circuit to prevent the motor from being energized to rotate in a direction associated with closing the lid, when the retract-limit switch is engaged.

6. The accessory port of claim 1, further comprising:
   an extension-limit switch;
   an extension to engage the extension-limit switch when the lid is open; and
   wherein the extension-limit switch opens a circuit to prevent the motor from being energized to rotate in a direction associated with opening the lid, when the extension-limit switch is engaged.

7. The accessory port of claim 1, wherein the lid is rotated along a longitudinal axis offset from the center of the lid.

8. The accessory port of claim 1, wherein the cam channel comprises varying angles, relative to the longitudinal axis, along the screw cam to vary the amount of longitudinal travel in relation to a fixed unit of rotational motion.

9. The accessory port of claim 1, wherein the motor, upon encountering a resistance to motion greater than a previously determined threshold, terminates operation.

10. The accessory port of claim 1, further comprising having the accessory port mounted to a vehicle for operation by a processor of the vehicle.

11. A method for operating an accessory port, comprising:
    energizing a motor with a first current flow to cause the motor to rotate a shaft a first direction, the shaft being coaxially aligned with a longitudinal axis;
    wherein the rotation of the shaft further rotates a screw cam comprising a cam channel disposed at an angle to the longitudinal axis along the exterior of the screw cam and engaging a fixed guide pin;
    wherein the rotation of the screw cam, via engagement of the cam channel with the guide pin fixed in a housing, converts a portion of the rotation into a longitudinal force and thereby causes the screw cam to travel along the longitudinal axis; and
    wherein the screw cam transfers rotational force and longitudinal force to a lid attached thereto and thereby cause the lid to both rotate and travel away from the housing.

12. The method of claim 11, further comprising:
    energizing the motor with a second current flow, opposite of the first current flow, to cause the motor to rotate the shaft in a second direction; and
    wherein the screw cam transfers the rotational force and longitudinal force to the lid attached thereto and thereby cause the lid to both rotate and travel towards the housing.

13. The method of claim 12, further comprising:
    measuring a force exerted by the motor;
    determining whether the force is above a previously determine threshold; and upon determining the force is above the previously determined threshold, de-energizing the motor with respect to the first current flow.

14. The method of claim 12, further comprising:

engaging a limit switch upon the travel of the screw cam reaching a previously determined limit; and wherein the limit switch, when engaged, opens a circuit that de-energizes the motor with respect to the second current flow.

15. The method of claim 13, further comprising:

upon determining the force is above the previously determined threshold, energizing the motor with a second current flow opposite of the first current flow.

16. The method of claim 11, further comprising:

engaging a limit switch upon the travel of the screw cam reaching a previously determined limit; and wherein the limit switch, when engaged, opens a circuit that de-energizes the motor with respect to the first current flow.

17. A vehicle accessory port system, comprising:

a powered accessory port, the powered accessory port comprising a lid selectively concealing an interior portion of the powered accessory port;

a processor that receives an input and, in response to the input, energizes a motor of the powered accessory port; and wherein the motor, when energized, provides a rotational force to a screw cam having disposed thereon a cam channel engaging a guide pin fixed to a housing of the powered accessory port and converting a portion of the rotational force of the motor to a longitudinal force and thereby lift and rotate a lid attached to the screw cam.

18. The vehicle accessory port system of claim 17, further comprising:

a communication interface to receive a request for access to the interior portion of the powered accessory port; and wherein the communication interface provides the request as the input, to the processor.

19. The vehicle accessory port system of claim 18, wherein:

the interior portion of the powered accessory port houses a connection for charging an electrical storage component powering a vehicle;

the communication interface receives the request for access from an automated charging system; and in response to the request, the powered accessory port is energized to allow the automated charging system access to the connection.

* * * * *